(12) United States Patent
Theodore, Jr.

(10) Patent No.: US 10,570,574 B2
(45) Date of Patent: Feb. 25, 2020

(54) TEMPERATURE CONTROLLED STRUCTURE ASSEMBLY

(71) Applicant: Michael Gregory Theodore, Jr., Plymouth, MI (US)

(72) Inventor: Michael Gregory Theodore, Jr., Plymouth, MI (US)

(\*) Notice: Subject to any disclaimer, the term of this patent is extended or adjusted under 35 U.S.C. 154(b) by 0 days.

(21) Appl. No.: 16/280,338

(22) Filed: Feb. 20, 2019

(65) Prior Publication Data

US 2019/0177926 A1 Jun. 13, 2019

Related U.S. Application Data

(62) Division of application No. 14/877,007, filed on Oct. 7, 2015, now Pat. No. 10,358,778.

(Continued)

(51) Int. Cl.
| | |
|---|---|
| *E01C 11/26* | (2006.01) |
| *E01C 11/24* | (2006.01) |
| *E04C 2/10* | (2006.01) |
| *E04C 2/20* | (2006.01) |

(Continued)

(52) U.S. Cl.
CPC ............ *E01C 11/265* (2013.01); *B23P 15/26* (2013.01); *E01C 11/245* (2013.01); *E04C 2/10* (2013.01); *E04C 2/20* (2013.01); *E04C 2/525* (2013.01); *E04H 4/129* (2013.01); *F24D 3/005* (2013.01); *F24D 3/14* (2013.01); *F24D 3/141* (2013.01); *F24D 3/142* (2013.01); *F24D 3/148* (2013.01);

(Continued)

(58) Field of Classification Search
None
See application file for complete search history.

(56) References Cited

U.S. PATENT DOCUMENTS

| | | | |
|---|---|---|---|
| 1,800,150 A | 4/1931 | Musgrave et al. | |
| 3,037,746 A | 6/1962 | Williams | |

(Continued)

FOREIGN PATENT DOCUMENTS

| | | |
|---|---|---|
| DE | 2909321 A1 | 9/1980 |
| DE | 202004002127 U1 | 8/2004 |

(Continued)

OTHER PUBLICATIONS

Design of Vapor-Compression Refrigeration Cycles—Brokowski (1997).

(Continued)

*Primary Examiner* — Cassey D Bauer
*Assistant Examiner* — Jenna M Hopkins
(74) *Attorney, Agent, or Firm* — Shumaker, Loop & Kendrick, LLP; James D. Miller

(57) ABSTRACT

A temperature controlled structure assembly comprises an array of structural panels each including at least one channel formed therein. At least one channel of each of the structural panels is aligned with at least one of the channels of an adjacent one of the structural panels to form a continuous channel extending through the array of the structural panels. At least one functional panel overlays the array of structural panels and is exposed for contact with a user. At least one heat exchanging element is disposed within the continuous channel and configured to exchange heat with the at least one functional panel in order to heat or cool the at least one functional panel.

46 Claims, 8 Drawing Sheets

Related U.S. Application Data

(60) Provisional application No. 62/112,845, filed on Feb. 6, 2015.

(51) Int. Cl.
| | |
|---|---|
| *F25B 21/02* | (2006.01) |
| *B23P 15/26* | (2006.01) |
| *H05B 3/18* | (2006.01) |
| *H05B 3/06* | (2006.01) |
| *F24D 3/14* | (2006.01) |
| *F24D 3/00* | (2006.01) |
| *E04H 4/12* | (2006.01) |
| *E04C 2/52* | (2006.01) |
| *F24D 13/02* | (2006.01) |

(52) U.S. Cl.
CPC ............ *F24D 13/024* (2013.01); *F25B 21/02* (2013.01); *H05B 3/06* (2013.01); *H05B 3/18* (2013.01); *Y02B 30/24* (2013.01); *Y02B 30/26* (2013.01)

(56) References Cited

U.S. PATENT DOCUMENTS

| | | | |
|---|---|---|---|
| 3,568,924 A * | 3/1971 | Chenault | E01C 11/26 237/1 R |
| 3,875,996 A | 4/1975 | Von Kohorn et al. | |
| 3,886,998 A | 6/1975 | Rowekamp | |
| 3,994,278 A | 11/1976 | Pittinger | |
| 4,069,973 A | 1/1978 | Edwards | |
| 4,085,731 A | 4/1978 | Weir | |
| 4,109,859 A | 8/1978 | Durst | |
| 4,250,957 A * | 2/1981 | McClendon | F24D 3/14 165/45 |
| 4,444,177 A | 4/1984 | Kirchmayer | |
| 4,508,162 A | 4/1985 | Radtke | |
| 4,576,221 A | 3/1986 | Fennesz | |
| 4,646,814 A | 3/1987 | Fennesz | |
| 4,693,300 A | 9/1987 | Adachi | |
| 4,907,418 A | 3/1990 | DeFazio | |
| 5,014,770 A | 5/1991 | Palmer | |
| 5,292,065 A * | 3/1994 | Fiedrich | F24D 3/14 237/69 |
| 5,454,428 A | 10/1995 | Pickard et al. | |
| 5,779,143 A | 7/1998 | Michaud et al. | |
| 5,931,381 A | 8/1999 | Fiedrich | |
| 5,957,378 A * | 9/1999 | Fiedrich | F24D 3/14 237/69 |
| 6,152,377 A * | 11/2000 | Fiedrich | F24D 3/14 237/69 |
| 6,330,980 B1 | 12/2001 | Fiedrich | |
| 6,526,965 B1 | 3/2003 | Devore | |
| 6,805,298 B1 | 10/2004 | Corbetter | |
| 6,926,077 B2 | 8/2005 | Kuga et al. | |
| 6,969,832 B1 | 11/2005 | Daughtry, Sr. | |
| 7,021,372 B2 | 4/2006 | Pickard | |
| 8,561,677 B2 | 10/2013 | Miyamura et al. | |
| 8,752,346 B1 | 6/2014 | Shaw et al. | |
| 9,285,125 B2 | 3/2016 | Lee et al. | |
| 9,404,665 B1 * | 8/2016 | Kayhart | F24D 3/14 |
| 9,803,890 B2 | 10/2017 | Murphy | |
| 9,896,843 B2 | 2/2018 | Peng et al. | |
| 2002/0117166 A1 * | 8/2002 | Okumura | F24D 5/005 126/633 |
| 2002/0136543 A1 | 9/2002 | Thorin | |
| 2003/0163965 A1 | 9/2003 | Hydock | |
| 2004/0040693 A1 * | 3/2004 | Fiedrich | F24D 3/14 165/56 |
| 2005/0188710 A1 | 9/2005 | Dilk et al. | |
| 2005/0252226 A1 | 11/2005 | Seefeldt | |
| 2008/0017725 A1 | 1/2008 | Backman, Jr. | |
| 2008/0230207 A1 | 9/2008 | Nakamura et al. | |
| 2008/0245403 A1 | 10/2008 | Stimson et al. | |
| 2009/0188985 A1 | 7/2009 | Scharing et al. | |
| 2009/0287355 A1 | 11/2009 | Milder et al. | |
| 2009/0314848 A1 | 12/2009 | Andersson | |
| 2010/0059501 A1 * | 3/2010 | Davidson | H05B 3/68 219/465.1 |
| 2010/0116947 A1 | 5/2010 | Winkler | |
| 2010/0132107 A1 | 6/2010 | Aguilera Galeote | |
| 2012/0091109 A1 | 4/2012 | Bruan et al. | |
| 2012/0267067 A1 | 10/2012 | Sullivan et al. | |
| 2013/0025824 A1 * | 1/2013 | Wolff | F24D 3/14 165/104.11 |
| 2013/0067654 A1 | 3/2013 | Deloche et al. | |
| 2013/0180191 A1 * | 7/2013 | Teron | E04B 5/48 52/220.1 |
| 2013/0240497 A1 | 9/2013 | Feng et al. | |
| 2014/0060669 A1 * | 3/2014 | Guo | E04F 15/0215 137/362 |
| 2014/0069605 A1 * | 3/2014 | Sullivan | B21D 47/00 165/56 |
| 2014/0096763 A1 | 4/2014 | Barmore | |
| 2014/0096931 A1 | 4/2014 | Keiichiro et al. | |
| 2014/0116644 A1 * | 5/2014 | Kaneko | F24D 3/142 165/56 |
| 2014/0196867 A1 | 7/2014 | Tarraga Sanchez et al. | |
| 2014/0308076 A1 | 10/2014 | Rabibnia | |
| 2014/0367477 A1 | 12/2014 | Cha | |
| 2015/0034067 A1 | 2/2015 | Szekely | |
| 2015/0075103 A2 | 3/2015 | Richards | |
| 2015/0136361 A1 * | 5/2015 | Gregory | F28F 21/062 165/104.19 |
| 2015/0153080 A1 | 6/2015 | MacPherson | |
| 2015/0276233 A1 * | 10/2015 | Berchtold | E04B 1/74 165/49 |
| 2015/0285522 A1 * | 10/2015 | Berchtold | E04B 1/74 165/218 |
| 2015/0292772 A1 | 10/2015 | Murphy | |
| 2015/0308697 A1 * | 10/2015 | Berchtold | E04B 1/74 52/1 |
| 2015/0309697 A1 | 10/2015 | Filippov et al. | |
| 2015/0345805 A1 * | 12/2015 | Butler | F24D 19/106 700/300 |
| 2016/0091212 A1 | 3/2016 | Frieling | |
| 2016/0097545 A1 * | 4/2016 | Chang | F24D 19/1009 237/8 A |
| 2016/0146508 A1 | 5/2016 | Gornik | |
| 2016/0230767 A1 | 8/2016 | Thompson et al. | |
| 2016/0281905 A1 | 9/2016 | Fox | |

FOREIGN PATENT DOCUMENTS

| | | | | |
|---|---|---|---|---|
| DE | 102006053721 A1 | 5/2008 | | |
| DE | 202011106736 U1 | 1/2013 | | |
| EP | 0322875 A2 | 7/1989 | | |
| EP | 1036991 A2 | 9/2000 | | |
| EP | 2148142 A1 | 1/2010 | | |
| EP | 2402664 A2 | 1/2012 | | |
| EP | 2538148 A1 * | 12/2012 | ............ | F24F 3/1603 |
| FR | 2561286 A1 * | 9/1985 | ............ | E04C 2/521 |
| FR | 2790819 A1 | 9/2000 | | |
| WO | 8807159 A1 | 9/1988 | | |
| WO | 2006024065 A1 | 3/2006 | | |
| WO | 2006054335 A1 | 5/2006 | | |
| WO | 2008043478 A2 | 4/2008 | | |
| WO | 2011129637 A2 | 10/2011 | | |
| WO | 2011155663 A1 | 12/2011 | | |
| WO | 2012019411 A1 | 2/2012 | | |
| WO | 2012040968 A1 | 4/2012 | | |
| WO | 2013044610 A1 | 4/2013 | | |
| WO | WO-2013081434 A1 * | 6/2013 | ............ | F24D 3/14 |
| WO | 2014001304 A1 | 1/2014 | | |
| WO | 2014035091 A1 | 3/2014 | | |
| WO | 2014047691 A1 | 4/2014 | | |

OTHER PUBLICATIONS

Heat Pipes: Review, Opportunities and Challenges—Faghri (2014).
Voluntary Product Standard PS 1-07-NIST (2007).
Voluntary Product Standard PS 2-04.

(56) References Cited

OTHER PUBLICATIONS

Vapour-Compression Refrigeration Cycle Definition—Retrieved Jul. 2017.
DE 102006053721 A1 English Machine Translation—Retrieved Apr. 2018.
Construction and Industrial Plywood PS1-95 (1995).
DE 202004002127U1 English Machine Translation—Retrieved Apr. 2018.
Guidelines for Safe Recreational Water Environments—WHO (2006).
Reservoirs, Tower, and Tanks—Bhardwaj (2001).
FR 2790819 English Machine Translation Retrieved Sep. 2017.
WO 2006024065 English Machine Translation Retrieved Sep. 2017.
DE 2909321 English Machine Translation Retrieved Sep. 2017.
WO 2008043478 A2 English Machine Translation Retrieved Sep. 2017.
CH1987000035 Installation for the Exploitation of Atmospheric and Terrestrial Heat Sep. 6, 2017.

* cited by examiner

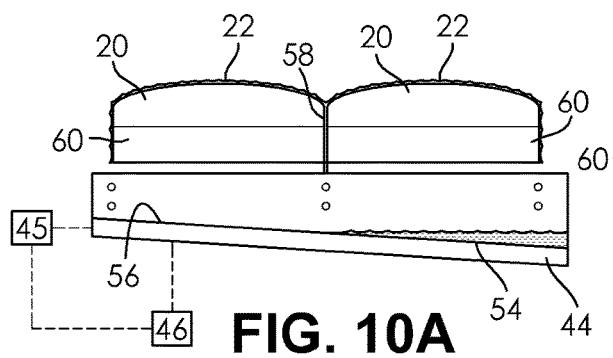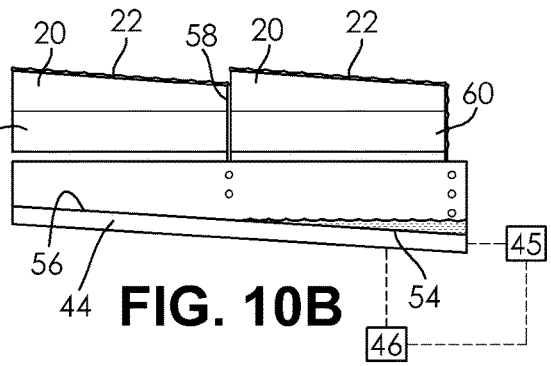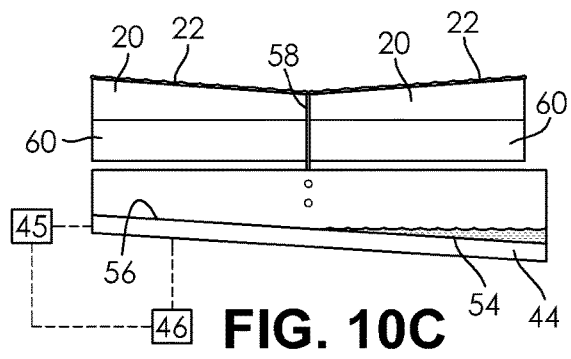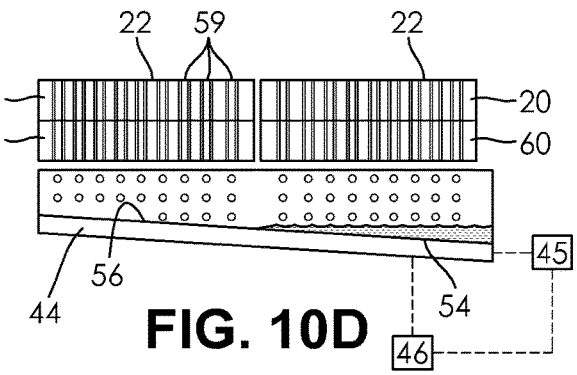

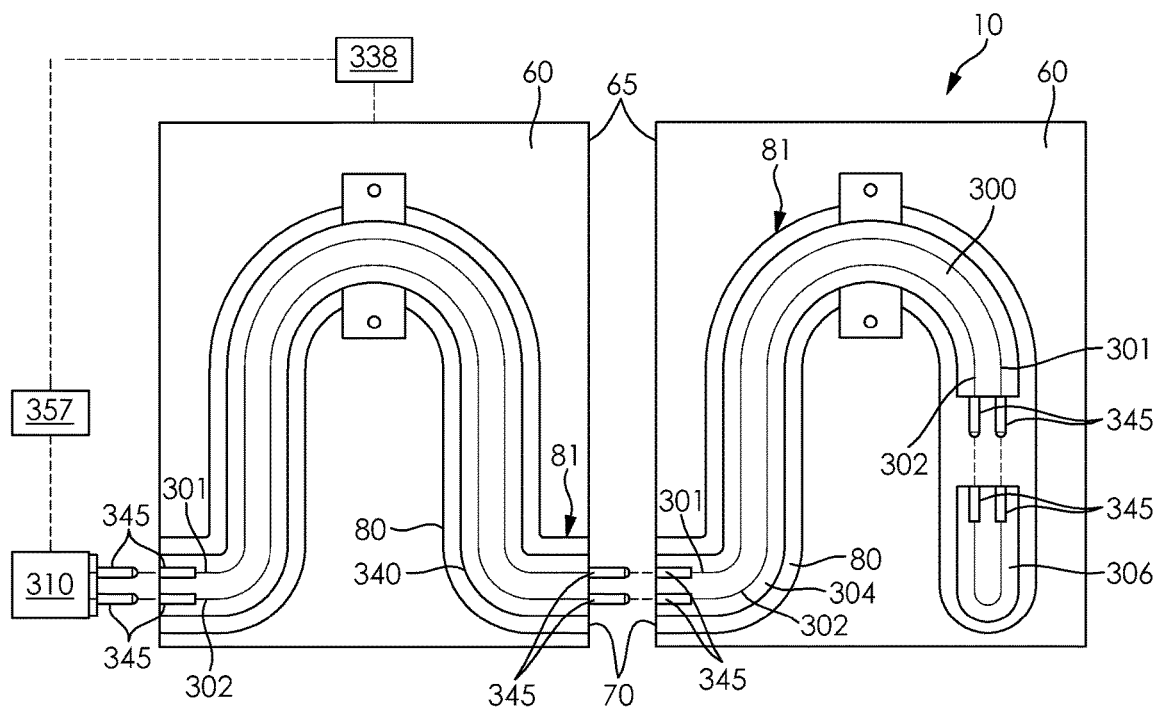
FIG. 15
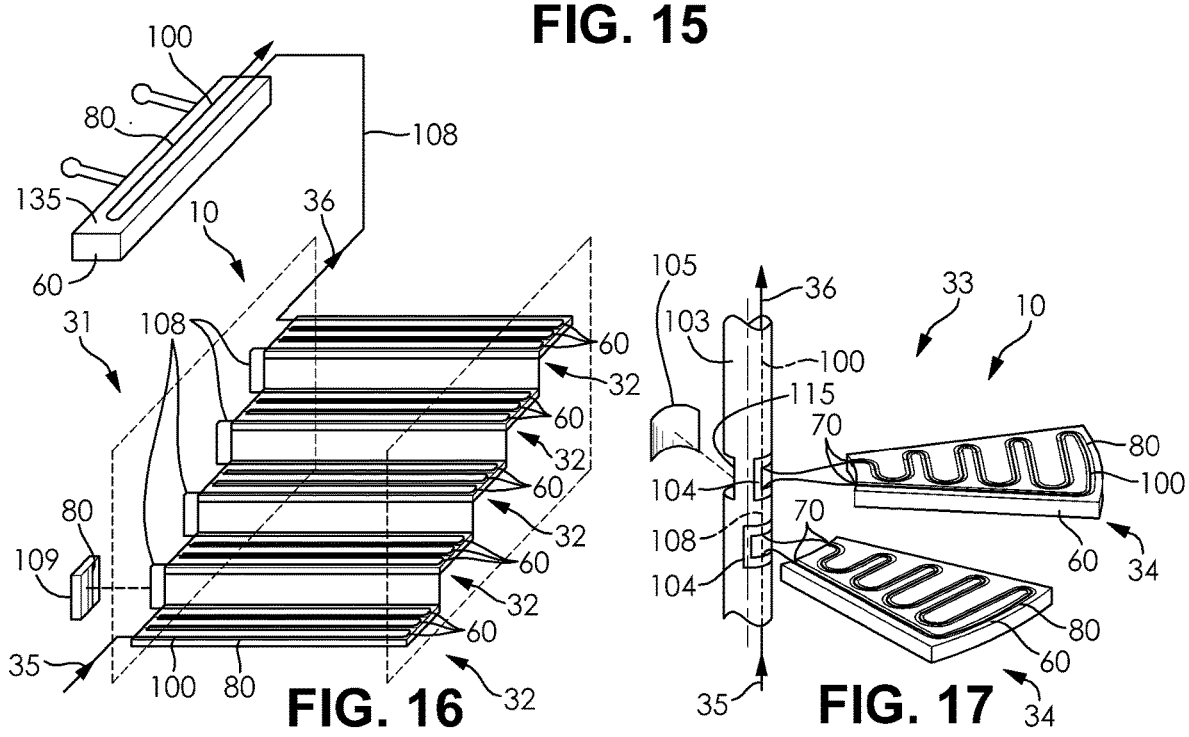
FIG. 16     FIG. 17

TEMPERATURE CONTROLLED STRUCTURE ASSEMBLY

CROSS-REFERENCE TO RELATED APPLICATIONS

This patent application is a divisional patent application of U.S. patent application Ser. No. 14/877,007, filed Oct. 7, 2015, which claims priority to U.S. Provisional Patent Application Ser. No. 62/112,845, filed Feb. 6, 2015, the entire disclosures of which are hereby incorporated herein by reference.

FIELD OF THE INVENTION

The invention relates to a structure assembly, and more particularly to a structure assembly including a heat exchanging element disposed within a channel formed in the structure.

BACKGROUND OF THE INVENTION

Traditional materials for forming flooring structures or walkways include composite materials, wood, pre-cast concrete, and brick, as non-limiting examples. These materials may be used to form traditional structures such as decks, bridges, staircases, sidewalks, pathways, patios, driveways, and the like. The traditional materials are commonly selected for their favorable appearance and structural stability, but these materials also tend to exhibit the undesirable characteristic of becoming too hot when exposed to high ambient temperatures and long periods of sun exposure or too cold when exposed to low ambient temperatures. Additionally, precipitation such as snow or freezing rain may cause the materials to be unsafe for walking when the materials are used to form outdoor structures.

The accumulation of snow or ice on such structures can be particularly problematic for certain individuals who are physically incapable of removing such precipitation. For example, elderly individuals or individuals having suffered from an aneurysm or stroke may be advised to not lift objects above a certain weight such as thirty pounds, for example. As a result, it can be nearly impossible for such an individual to clear a pathway following periods of heavy snowfall. Additionally, the use of scraping utensils or traditional snow shovels can potentially cause damage to the traditional materials. Furthermore, the use of salt on similarly iced surfaces can cause damage to materials such as concrete while the run-off from the salt can pose an environmental hazard.

Several systems have been developed to heat or cool various floor surfaces, but these systems have numerous drawbacks. First, available systems require a complex installation process in which several components forming the system are securely affixed in a manner wherein the system may not be easily altered or otherwise replaced. Accordingly, the use of such systems is not conducive to updating or replacing the components thereof, including the exposed finish of the flooring structure, without requiring considerable time and expense. Second, available systems are not easily configured for placement in complex configurations including three-dimensional structures. The inability of available systems to be formed into complex structures prevents available systems from being utilized in structures that pose considerable risks to a user, including staircases and ramps, for example.

It would therefore be desirable to produce a temperature controlled structure assembly suitable for creating complex and customized structures that is also capable of heating or cooling an exposed surface of the structure.

SUMMARY OF THE INVENTION

Compatible and attuned with the present invention, a temperature controlled structure assembly capable of forming complex and customized three-dimensional structures has surprisingly been discovered.

In one embodiment of the invention, a temperature controlled structure assembly comprises a plurality of structural panels and a plurality of functional panels exposed for contact with a user. Each of the functional panels contacts at least one of the structural panels. A channel is formed in at least one of a surface of each of the structural panels and a surface of each of the functional panels, each of the channels intersecting at least one of a peripheral edge of one of the structural panels and a peripheral edge of one of the functional panels to form a connection point of each of the channels. A heat exchanging element is disposed in each of the channels and is configured to exchange heat with at least one of the functional panels.

In another embodiment of the invention, a temperature controlled structure system comprises an array of structural panels. A channel is formed in a surface of each of the structural panels. Each of the channels intersects a peripheral edge of each of the structural panels to form a connection point of the channel. A functional panel overlays the structural panels and is exposed for contact with a user. A conduit is disposed within the channel formed in each of the structural panels for conveying a first fluid therethrough, the first fluid configured to exchange heat with the functional panel. The fluid conduit extends between an inlet of the structural panels to an outlet of the structural panels. The system further comprises a pump causing the first fluid to flow through the conduit. A first fluid line is in fluid communication with the conduit, the first fluid line extending outside of the structural panels from the outlet and back to the inlet, the first fluid line in fluid communication with at least one of a heat exchanger and a fluid source configured to store the first fluid.

In another embodiment of the invention, a temperature controlled structure system comprises an array of structural panels, an array of functional panels overlaying the structural panels and exposed for contact with a user, and a channel formed in a surface of each of the functional panels. The channel intersects a peripheral edge of each of the functional panels to form a connection point of the channel. A conduit is disposed within the channel formed in each of the functional panels for conveying a first fluid therethrough, the first fluid configured to exchange heat with each of the functional panels. The conduit extends between an inlet of the array of functional panels to an outlet of the array of functional panels. A pump causes the first fluid to flow through the conduit. A first fluid line is in fluid communication with the conduit, the first fluid line extending outside of the array of functional panels from the outlet and back to the inlet, the first fluid line in fluid communication with at least one of a heat exchanger and a fluid source configured to store the first fluid.

A method of forming a temperature controlled structure is also disclosed, the method comprising the steps of providing an array of structural panels, a channel formed in a surface of each of the structural panels, the channel intersecting a peripheral edge of each of the structural panels to form a connection point of the channel; routing at least one heat exchanging element through the channel of each of the structural panels, wherein at least one heat exchanging element extends across at least one of the connection points; and coupling a functional panel to the structural panels, wherein the functional panel is disposed on the surface of each of the structural panels having the channel formed therein.

Another method of forming the temperature controlled structure assembly is also disclosed. The method comprises the steps of assembling an array of structural panels; providing an array of functional panels, a channel formed in a surface of each of the functional panels, the channel intersecting a peripheral edge of each of the functional panels to form a connection point of the channel; routing at least one heat exchanging element through the channel of each of the functional panels, wherein at least one heat exchanging element extends across at least one of the connection points; coupling the at least one heat exchanging element to the array of functional panels; and coupling the array of functional panels having the heat exchanging element coupled thereto to the array of structural panels.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings:

FIG. 10A is a schematic view of a drip pan and a pair of functional panels having a convex outer surface;

FIG. 10B is a schematic view of a drip pan and a pair of functional panels having inclined surfaces facing in a common direction;

FIG. 10C is a schematic view of a drip pan and a pair of functional panels having inclined surfaces facing toward each other;

FIG. 10D is a schematic view of a drip pan and a pair of functional panels having a plurality of holes formed therein;

FIG. 15 is a partially exploded top plan view of the temperature controlled structure assembly including an electrical element according to a another embodiment of the invention;

FIG. 16 is a partially exploded front perspective view of a traditional staircase formed from the temperature controlled structure assembly;

FIG. 17 is a fragmentary front perspective view of a spiral staircase formed from the temperature controlled structure assembly.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-20 illustrate a temperature controlled structure assembly 10 according to an embodiment of the invention. The temperature controlled structure assembly 10 may be used to form both indoor structures as well as outdoor structures that are intended to be traversed by a person or personal vehicle. For example, the temperature controlled structure assembly 10 may be applied to roadways, decks, patios, walkways, platforms, indoor flooring, staircases, or any other traditional surfaces on which a person may walk, stand, or operate a personal vehicle such as a bicycle or wheelchair, for example. Furthermore, it should be understood by one skilled in the art that the temperature controlled structure assembly 10 may be configured for use on any surface that may require heating or cooling to ensure the comfort or safety of a person coming into contact with the surface. Accordingly, the temperature controlled structure assembly 10 may also be adapted for use in other structures such as walls, benches, chairs, handrails, crates, and pallets, as non-limiting examples.

When applied to an indoor structure, the temperature controlled structure assembly 10 may be used primarily to control a temperature of an indoor flooring structure that may come into contact with the person standing, walking, sitting, or otherwise traversing or being supported by the indoor flooring structure. The temperature controlled structure assembly 10 may be used primarily to heat or cool the indoor flooring structure in accordance with a desired comfort level of the user. When applied to an outdoor flooring structure, the temperature controlled structure assembly 10 may also be used to heat or cool the outdoor flooring structure in accordance with a comfort level of the user. Additionally, the temperature controlled structure assembly 10 may also be used for the specific purposes of cooling outdoor flooring structures exposed for extended periods to sunlight or for melting ice or snow that may develop on the outdoor flooring structures when exposed to precipitation and low ambient temperatures. As explained hereinafter, the temperature controlled structure assembly 10 may be configured for a wide variety of structures and for a wide variety of applications, as desired.

Figure 1:
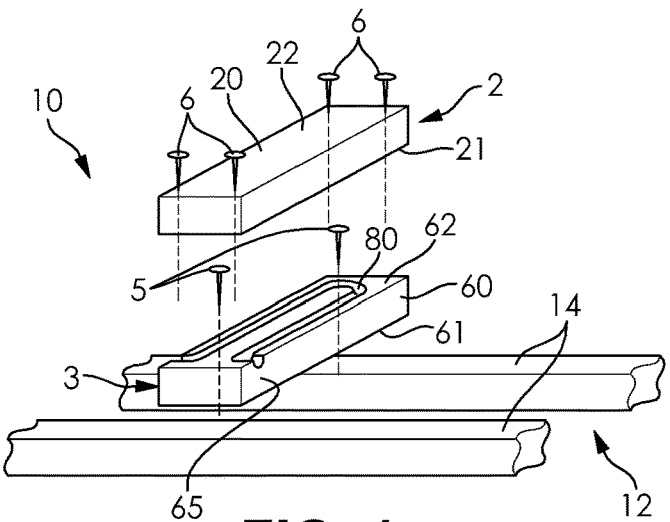
FIG. 1 is a fragmentary exploded perspective view illustrating a temperature controlled structure assembly according to an embodiment of the invention.

As shown in FIG. 1, the temperature controlled structure assembly 10 comprises a functional layer 2 comprised of at least one functional panel 20 and a structural layer 3 comprised of at least one structural panel 60. Each of the functional panels 20 forms a portion of the temperature controlled structure assembly 10 that is exposed to and capable of coming into contact with the user or an article associated with the user. Accordingly, the functional panels 20 may alternatively be referred to as functional elements 20 or exposed panels 20, as desired. The functional panels 20 or functional elements 20 may be chosen to serve a particular function, including being aesthetically pleasing, durable, or robust, depending on the application. The functional panels 20 or functional elements 20 may for instance be formed from traditionally exposed materials such as wood, concrete, brick, bamboo, tile, asphalt, laminates, and composites, as non-limiting examples. Accordingly, the functional layer 2 of the temperature controlled structure assembly 10 may include a single element 20 or a plurality of modular elements 20 configured for assembly together, depending on the application and the type of materials used to form the functional panels 20 or elements 20. The functional panels 20 or functional elements 20 may also include heat transfer improving materials such as powdered aluminum, formed within a material matrix of the functional panels 20, to increase a heat transfer capability thereof.

Each of the structural panels 60 is configured to underlay one or more of the functional panels 20. Each of the structural panels 60 may be formed from any suitable material including Duroplast®, plastic, composite materials, or particle board, as non-limiting examples. The structural panels 60 may be formed from a base material that is not as aesthetically pleasing as the functional panels 20 due to the structural panels 60 being hidden from view following full installation of the temperature controlled structure assembly 10. For example, the structural panels 60 may be formed from waste or scrap materials such as scrap wood having an otherwise undesirable quantity of knots or other imperfections or flaws. The structural panels 60 may also be formed from materials including fillers such as shredded tires, shredded palm fronds, shredded bamboo, or chimney fly ash, as non-limiting examples. The structural panels 60 may also include heat transfer improving materials such as conductive materials, conductive fibers, conductive powders, metals, powdered metals, powdered aluminum, and the like, for example, formed within a material matrix of the structural panels 60, to increase a heat transfer capability thereof. It is desirable for the structural panels 60 to be formed from any cost-effective material having desirable characteristics suitable for the applications of the temperature controlled structure assembly 10. The structural panels 60 may alternatively be referred to as hidden panels 60 due to the inconspicuous appearance of the panels 60. Additionally, due to the large variety of available shapes, sizes, and orientations of the structural panels 60, the structural panels 60 may alternatively be referred to as structural elements 60. The structural layer 3 may accordingly be formed from a single structural panel 60 or structural element 60 or from a plurality of modular structural panels 60 or structural elements 60, as desired.

The temperature controlled structure assembly 10 may be applied to an underlying structural frame 12. As illustrated in FIG. 1, the structural frame 12 may comprise a plurality of spaced apart cross-members 14 extending substantially parallel to each other. The cross-members 14 may for example be a plurality of joists forming a portion of a building structure suitable for supporting any form of traditional flooring structure. Alternatively, the structural frame 12 may comprise any combination of structural components having a shape and configuration suitable for installing a desired structure such as the temperature controlled structure assembly 10. The structural frame 12 may be a portion of a structure configured for use with the temperature controlled structure assembly 10 that is not typically exposed visually when the structure is fully assembled. In some circumstances, the structural frame 12 may be formed from a portion of the ground surface if the temperature controlled structure assembly 10 is installed to an outdoor structure. It should be understood that the structural frame 12 may be formed from any material suitable for being coupled to the temperature controlled structure assembly 10 without departing from the scope of the present invention.

Figure 2:
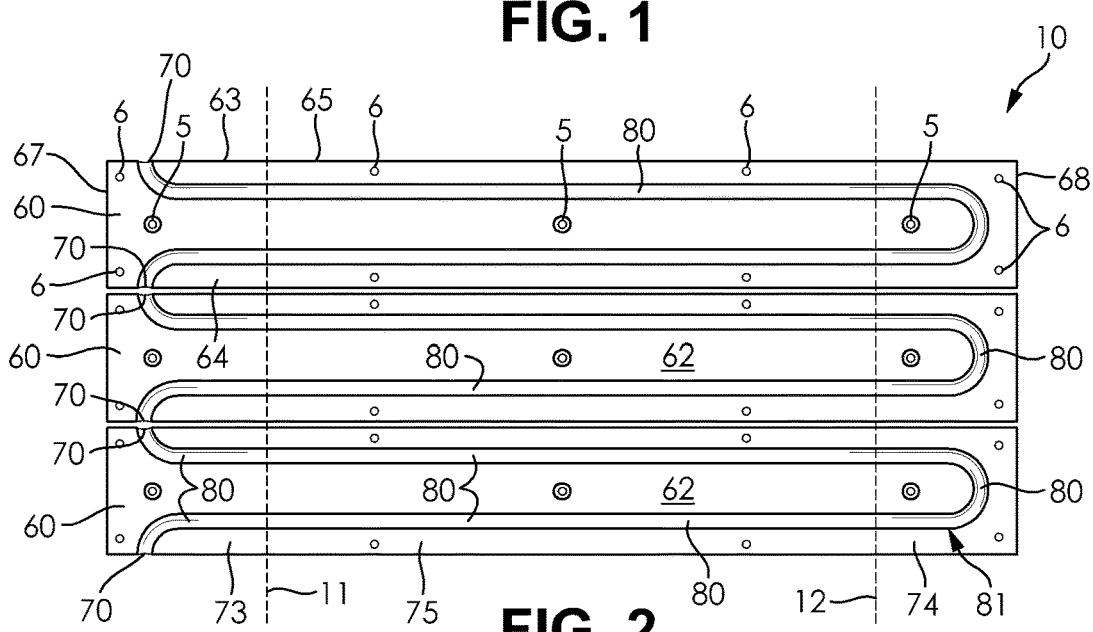
FIG. 2 is a top plan view illustrating an array of structural panels forming a temperature controlled structure assembly.

As best illustrated in FIG. 1, the structural panel 60 is typically configured to be directly coupled to the structural frame 12 and the functional panel 20. An inner face 61 of the structural panel 60 may abut the structural frame 12 and an oppositely arranged outer face 62 of the structural panel 60 may abut an inner face 21 of the functional panel 20. The inner face 21 of the functional panel 20 may be formed opposite an outer face 22 thereof that is exposed for contact with a user or the user's personal vehicle. The coupling of the structural panel 60 to the structural frame 12 may be accomplished using any known coupling device including traditional fastening devices such as screws, nails, bolts, or the like, or by the application of a suitable adhesive or bonding material. FIGS. 1 and 2 illustrate the structural panel 60 coupled to the structural frame 12 using a plurality of first fastening devices 5 positioned inboard from a peripheral edge 65 of the structural panel 60. Alternatively, other suitable structures or devices for securing a position of each of the structural panels 60 relative to the structural frame 12 may be used, as desired.

Similarly, the coupling of the functional panel 20 to the structural panel 60 may be accomplished using any known coupling device including traditional fastening devices such as screws, nails, bolts, or the like, or by the application of a suitable adhesive or bonding material. FIGS. 1 and 2 illustrate the functional panel 20 coupled to the structural panel 60 using a plurality of second fastening devices 6 positioned adjacent the peripheral edge 65 of the structural panel 60, and especially at corners of each of the structural panels 60. It should also be understood that an opposite arrangement wherein the first fastening devices 5 are disposed immediately adjacent the peripheral edge 65 of the structural panel 60 and the second fastening devices 6 are disposed inboard from the peripheral edge 65 of the structural panel 60 may be used without departing from the scope of the present invention. Alternatively, a position of the functional panels 20 may be secured relative to the underlying structural panels 60 by inserting a plurality of dowel pins (not shown) or other locating pins into corresponding apertures formed in each of the panels. Other suitable devices or structures for securing a position of each of the structural panels 60 relative to each of the functional panels 20 may be used, as desired.

In some circumstances, the interfacing surfaces of the functional panels 20 and the structural panels 60 may be painted or coated. A paint or a coating may for instance be a rubberized type paint or a waterproof type paint. The paint or the coating may be configured to provide a seal between the functional panels 20 and the structural panels 60 to prevent an intrusion of moisture or pests such as insects. The paint or the coating may be applied using an electrostatic application method or any conventional method.

In some embodiments, each of the at least one functional panels 20 has a size, shape, and configuration corresponding to one of the structural panels 60. For example, FIG. 1 illustrates a single one of the functional panels 20 having a size, a shape, and a configuration that substantially corresponds to a size, a shape, and a configuration of a single one of the structural panels 60. In other embodiments, the functional panels 20 and the structural panels 60 may have different sizes, shapes, and configurations, so long as the functional panels 20 are exposed and overlaying the structural panels 60. For example, a plurality of the functional panels 20 may overlay a single one of the structural panels 60 or a single one of the functional panels 20 may overlay a plurality of the structural panels 60, depending on the particular application. In some instances, the functional panels 20 may be configured to extend longitudinally in a direction perpendicular to a longitudinal direction of the underlying structural panels 60. Any ratio of the structural panels 60 to the functional panels 20 may be used without departing from the scope of the present invention.

As shown in FIGS. 1 and 2, each of the structural panels 60 includes at least one channel 80 formed therein. Each of the channels 80 is a hollow opening formed in the outer face 62 of each of the structural panels 60. Each of the channels 80 extends from one portion of the peripheral edge 65 of each of the structural panels 60 to another portion of the peripheral edge 65 thereof. Each intersection of each of the channels 80 with the peripheral edge 65 of a corresponding one of the structural panels 60 may be referred to as a connection point 70. Referring now to FIG. 2, three of the structural panels 60 are shown, wherein each of the structural panels 60 includes one of the channels 80 having a pair of the connection points 70 formed at each end of the one of the channels 80. In the configuration shown, each of the channels 80 extends from a first connection point 70 formed at a first side 63 of the peripheral edge 65 of a corresponding structural panel 60 to a second connection point 70 formed at an oppositely arranged second side 64 thereof. Each of the channels 80 extends away from a first end 67 of the peripheral edge 65 and toward a second end 68 thereof, wherein each of the channels 80 undergoes a 180° turn at a substantially U-shaped portion formed at the second end 68.

As shown in FIG. 2, each of the connection points 70 may be configured for alignment with a corresponding connection point 70 of an adjacent one of the structural panels 60. The alignment of the connection points 70 of adjacent ones of the structural panels 60 forms one continuous channel 81 comprised of each of the channels 80 formed in each of the constituent structural panels 60. Accordingly, it should be understood that an arrangement of the structural panels 60 and the corresponding connection points 70 is selected to ensure that the continuous channel 81 is formed by the cooperation of the entire array of the structural panels 60, hence the size, the shape, and the configuration of each of the channels 80 formed within each of the structural panels 60 may be selected accordingly to achieve this configuration.

Each of the structural panels 60 shown in FIG. 2 includes a single one of the channels 80 having a pair of the connection points 70, but it should be understood that other configurations of the structural panels 60 may be used including multiple channels 80 and more than two connection points 70, as desired. For example, FIG. 2 includes a first dashed line 11 and a second dashed line 12 showing a potential division of each of the structural panels 60 into three separate and distinct panels. A first end panel 73 may include a pair of the channels 80, wherein each of the channels 80 includes a 90° turn and a pair of connection points 70 arranged perpendicular to each other. A second end panel 74 may include a single channel 80, wherein the single channel 80 includes the 180° turn and a pair of connection points 70 arranged on a common side surface thereof. A central panel 75 may include a pair of substantially parallel linear channels 80, each having a pair of oppositely arranged connection points 70. As should be understood, various configurations of the different panels 73, 74, 75 may be used to create an array of the structural panels 60 having a desired shape, size, and configuration.

It should also be understood that the structural panels 60 may be provided having a variety of shapes and sizes for customizing the shape and the design of the temperature controlled structure assembly 10. For example, the central panel 75 may be selected to have any suitable length while still being capable of being aligned with the connection points 70 of the adjacent first end panel 73 and the second end panel 74. Accordingly, any given dimension of the temperature controlled structure assembly 10 in any given direction may be selected by choosing the appropriate length of each of the different structural panels 20 forming the array. Additionally, a pattern or configuration of each of the channels 80 formed in each of the structural panels 60 may have any desired number of curves, bends, or turns, so long as each of the channels 80 extends from one connection point 70 to another connection point 70 in a manner that produces one continuous channel 81 when adjacent ones of the structural panels 60 are installed to form the temperature controlled structure assembly 10. In some cases, each of the channels 80 has a winding or corrugated profile to ensure that the greatest possible surface area of the structural panels 20 form portions of the channels 80.

Figure 3:
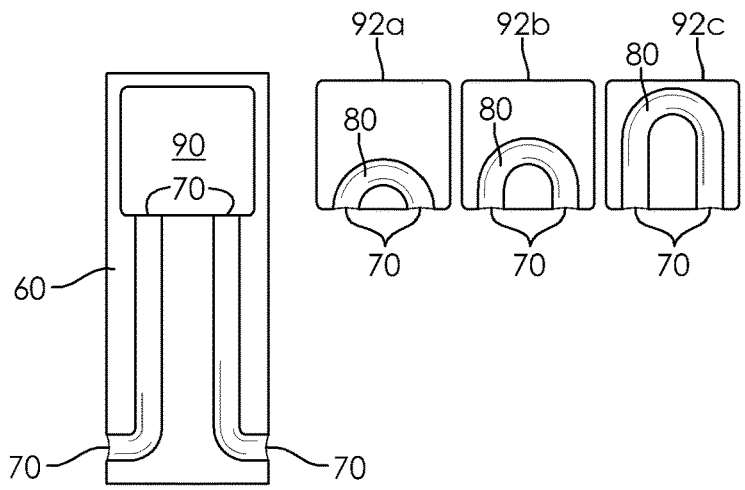
FIG. 3 is a top plan view illustrating a structural panel having a cut-out and a plurality of inserts configured to be inserted into the cut-out.

Referring now to FIG. 3, a structural panel 60 is shown having a cut-out 90 formed therein. The cut-out 90 is shown as substantially square, but the cut-out 90 may have any suitable shape and size while remaining within the scope of the present invention. The cut-out 90 may extend through an entirety of the structural panel 60 from the outer face 62 thereof to an inner face 61 thereof, or alternatively may be formed in the outer face 62 of the structural panel 60 and have a depth greater than a depth of any of the channels 80 formed in the structural panel 60. FIG. 3 also illustrates three different embodiments of a panel insert 92, wherein each of the panel inserts 92 includes at least one channel 80 formed therein having at least two connection points 70 corresponding to the connection points 70 formed at a periphery of the cut-out 90. A first panel insert 92a includes a U-shaped channel 80 that extends only partially inboard from a peripheral edge 95 thereof. A second panel insert 92b includes a U-shaped channel 80 that extends to a central region of the second panel insert 92b. A third panel insert 92c includes a U-shaped channel 80 that extends across a majority of the third panel insert 92c. Accordingly, one of the panel inserts 92a, 92b, 92c may be selected depending on a desired length or path of the continuous channel 81 formed by the cooperation of the channels 80 of the structural panels 60 and the panel inserts 92. It should also be understood that panel inserts 92 having a plurality of channels 80 formed therein with a corresponding plurality of connection points 70 may be used, as desired, so long as the assembled structural panels 60 and the panel inserts 92 have corresponding connection points 70 that are properly aligned therewith.

The structural panels 60 and the panel inserts 92 have been described as having a plurality of channels 80 aligned with adjacent panels 60 and/or inserts 92 at a plurality of connection points 70 for the purpose of creating a continuous channel 81 that extends through each of the panels 60 and/or the inserts 92 forming the temperature controlled structure assembly 10. The continuous channel 81, and accordingly each of the channels 80 forming the continuous channel 81, is configured to receive a heat exchanging element therein, wherein the heat exchanging element may be formed into one continuous component extending along a length of the continuous channel 81. The heat exchanging element may be any component or device suitable for being routed within the continuous channel 81 and for exchanging heat energy with the structural panels 60 and the functional panels 20. The heat exchanging element may accordingly be a fluid conduit 100 or an electrical element 300 routed throughout the continuous channel 81 or through a portion or select portions of the continuous channel 81.

Although the temperature controlled structure assembly 10 is shown and described as having the fluid conduit 100 routed throughout the continuous channel 81 with reference to FIGS. 1-12, it will be readily apparent that each of the structural panels 60 and the channels 80 illustrated in FIGS. 1-12 are similarly capable of receiving the electrical element 300 therein without departing from the scope of the present invention. Furthermore, the use of the continuous channel 81 formed within the array of the structural panels 60 allows for a fluid or other heat exchanging medium to flow directly through the continuous channel 81 so long as a suitable sealing means is provided at each of the connection points 70 and at each interface of the functional panels 20 and the structural panels 60.

The fluid conduit 100 is a heat exchanging element formed from a flexible material suitable for being received within each of the channels 80 forming the continuous channel 81. The fluid conduit 100 may accordingly be formed from a polymeric material such as rubber, as a non-limiting example. The fluid conduit 100 is configured to receive a first fluid therein that is then caused to circulate throughout the entirety of the fluid conduit 100. The first fluid may be any fluid suitable for exchanging heat energy with another medium. The first fluid may be water, glycol, antifreeze, Prestone® solution, brine, oil, combinations thereof, and the like, as non-limiting examples. The first fluid is configured to exchange heat energy with both the structural panels 60 and the functional panels 20 by heat transfer through the walls of the fluid conduit 100. Because the structural panels 60 are coupled to and overlaid by the functional panels 20, it should be understood that heat transfer may also occur between the structural panels 60 and the functional panels 20, hence the heating or the cooling of the structural panels 60 will tend to directly affect the heating or the cooling of the functional panels 20. Accordingly, the first fluid may be configured to increase or decrease a temperature of each of the functional panels 20 forming the temperature controlled structure assembly 10, depending on whether the first fluid or the functional panels 20 has a greater temperature when the first fluid is caused to circulate through the fluid conduit 100.

Figure 4A:
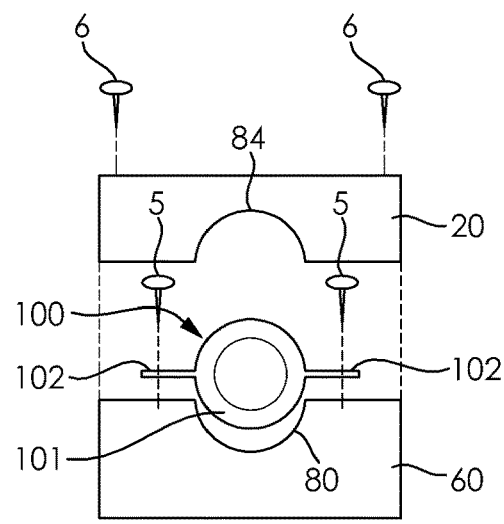
FIG. 4A is an exploded front elevational view of a fluid conduit according to one embodiment of the invention.
Figure 5:
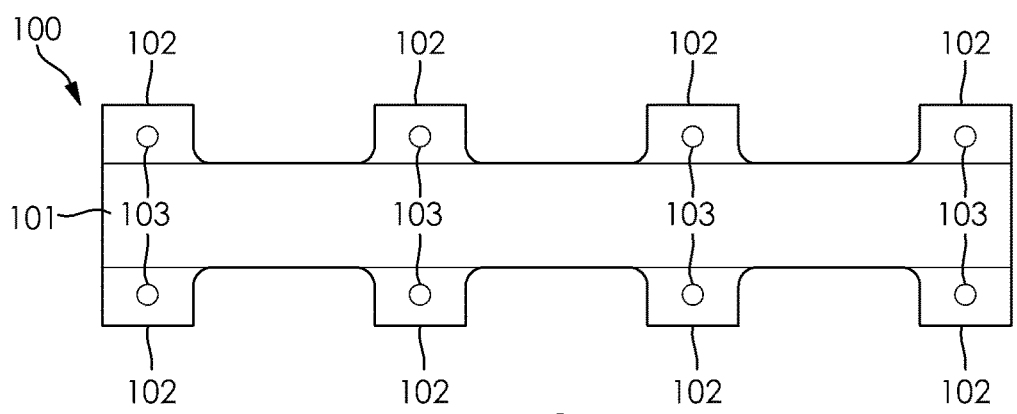
FIG. 5 is a top plan view illustrating a flanged portion of each of the fluid conduits illustrated in FIGS. 4A, 4B, and 4C.

Referring now to FIG. 4A, the fluid conduit 100 may be substantially cylindrical in shape and may include at least one flanged portion configured for coupling the fluid conduit 100 to a corresponding one of the structural panels 60. As shown in FIG. 4A, the flanged portion of the fluid conduit 100 may include a pair of radially outwardly extending tabs 102 that extend from opposite sides of a body 101 of the fluid conduit 100, wherein the body 101 may be substantially cylindrical in shape. As shown in FIG. 5, the tabs 102 may be spaced apart from each other periodically along a length of the fluid conduit 100. The spacing of the tabs 102 in a lengthwise direction of the fluid conduit 100 aids in ensuring that the fluid conduit 100 is flexible enough to be fitted to each bend or turn of the continuous channel 81. The tabs 102 may be suitable for receiving one of the first fastening devices 5 or one of the second fastening devices 6, as desired, for securing a position of the fluid conduit 100 relative to the continuous channel 81. In some embodiments, the fluid conduit 100 may be formed to have removable tabs 102. The removable tabs 102 may be capable of being cut or otherwise removed from the fluid conduit 100 at desired intervals to allow for a desired degree of flexibility in the fluid conduit 100. The tabs 102 may for example include perforated portions at an end thereof for easily removing the tabs 102, as desired. It should be understood that other methods of coupling the fluid conduit 100 to the structural panel 60 may be used, including the use of a suitable adhesive or bonding agent, for example.

The channel 80 formed in the structural panel 60 has a semi-circular cross-sectional shape to correspond to the body 101 of the fluid conduit 100. The use of a channel 80 having a cross-sectional shape that corresponds to the outer surface of the fluid conduit 100 aids in exchanging heat energy between the structural panel 60 and the fluid conduit 100 by increasing a contacting surface area formed therebetween. Additionally, the functional panel 20 is also shown as having a channel 84 formed therein having a semi-circular cross-sectional shape corresponding to an outer surface of the fluid conduit 100. The use of the semi-circular channel 84 formed in the functional panel 20 may further aid in transferring heat energy between the first fluid and the functional panel 20 via the fluid conduit 100 by increasing a contacting surface area therebetween.

Figure 4B:
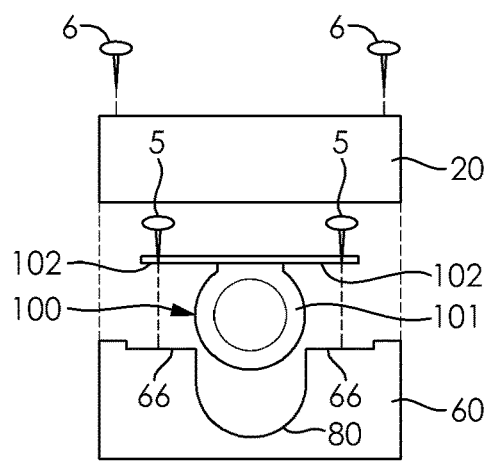
FIG. 4B is an exploded front elevational view of a fluid conduit according to another embodiment of the invention.

FIG. 4B illustrates an alternative arrangement of the fluid conduit 100. The fluid conduit 100 includes a pair of the tabs 102 extending tangentially from the body 101 of the fluid conduit 100. The structural panel 60 may accordingly be formed having a channel 80 having a cross-sectional shape including a rectangular portion and a semi-circular portion formed at a distal end of the rectangular portion. The channel 80 is accordingly deeper than the channel 80 illustrated in FIG. 4A to accommodate the body 101 of the fluid conduit 100 extending downwardly from the tabs 102. The structural panel 60 may further include at least one indented portion 66 corresponding to a shape and size of each of the tabs 102. The indented portions 66 ensure that the tabs 102 do not improperly space the functional panel 20 from the structural panel 60 when coupled to each other.

The tangentially extending tabs 102 offer several advantages over the radially outwardly extending tabs 102 illustrated in FIG. 4A. First, the tangentially extending tabs 102 include substantially planar surfaces in facing relationship with the functional panel 20 disposed directly thereover, thereby eliminating the need for the channel 84 formed in the functional panel 20 illustrated in FIG. 4A. By eliminating the channel 84, each of the functional panels 20 forming the temperature controlled structure assembly 10 may be produced more cost effectively by leaving the inner face 21 of the functional panel 20 substantially planar, thereby maximizing an ease of manufacturing each of the functional panels 20. Second, the use of tangentially extending tabs 102 eliminates the need for each of the channels 84 formed in each of the functional panels 20 from having to match and correspond to each of the channels 80 formed in the structural panels 60 to ensure a proper fit of the fluid conduit 100 therein. Accordingly, the use of functional panels 20 devoid of one or more of the channels 84 advantageously allows for greater customization of the temperature controlled structure assembly 10 by not requiring each structural panel 60 to require a specific configuration of each of the corresponding functional panels 20 disposed thereon.

Figure 4C:
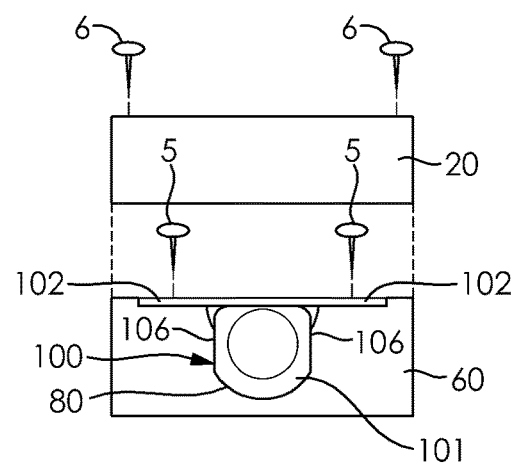
FIG. 4C is a partially exploded front elevational view of a fluid conduit according to another embodiment of the invention.

FIG. 4C illustrates yet another alternative arrangement of the fluid conduit 100. The fluid conduit 100 illustrated in FIG. 4C is substantially identical to the fluid conduit 100 illustrated in FIG. 4B except for the addition of a pair of linear surfaces 106 formed on opposing sides of the body 101 of the fluid conduit 100. The linear surfaces 106 allow for the fluid conduit 100 to further increase a surface area of contact formed between the structural panel 20 at the channel 80 and the fluid conduit 100. As should be understood, incorporation of the linear surfaces 106 also requires the channel 80 to be formed to have a corresponding cross-sectional shape including an arcuate portion that does not extend through an angle of 180°. The linear surfaces 106 may further aid in securing a position of the body 101 of the fluid conduit 100 within the channel 80 by allowing the cylindrical portion to be resiliently press fit into the channel 80, as desired. In other embodiments, the fluid conduit 100 may include more than two of the linear surfaces 106 formed into a substantially hexagonal shape for example, as desired.

Referring again to FIG. 5, the fluid conduit 100 may be produced by extruding a material to have a desired cross-sectional shape such as those shown in FIGS. 4A, 4B, and 4C, wherein the fluid conduit 100 includes both the body 101 and the flanged portion, while periodically punching or otherwise removing material from the flanged portion of the fluid conduit 100 to form each of the spaced apart tabs 102. Additionally, a plurality of apertures 103 may concurrently be punched or otherwise removed from the fluid conduit 100 during the extrusion process, wherein each of the apertures 103 may be configured to receive one of the first fastening devices 5 or one of the second fastening devices 6 therein. It should be understood that different configurations of the tabs 102 and the apertures 103 may be used without departing from the scope of the present invention.

Figure 6:
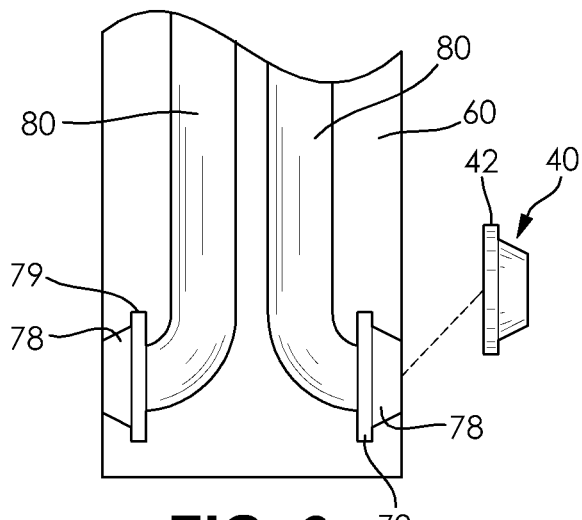
FIG. 6 is a fragmentary partially exploded top plan view illustrating a plug seal for sealing each connection point formed in each of the structural panels of FIGS. 2 and 3.
Figure 7:
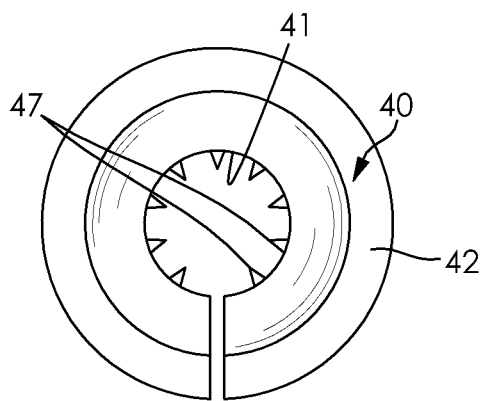
FIG. 7 is front elevational view of the plug seal illustrated in FIG. 6.

FIGS. 6 and 7 illustrate a plug seal 40 for sealing each of the channels 80 at each of their respective connection points 70. The plug seal 40 is configured to provide a seal between an outer surface of the fluid conduit 100 and a surface of the corresponding structural panel 60 defining the channel 80 at each of the connection points 70. Additionally, in some configurations, the plug seal 40 may also provide a seal between the outer surface of the fluid conduit 100 and the inner face 21 of the overlaying functional panel 20 at each of the connection points 70. The plug seal 40, also referred to as a ferrule or a gommet, is substantially conical in shape and includes an opening 41 formed through a center thereof for receiving the body 101 of the fluid conduit 100. An inner surface of the plug seal 40 defining the cylindrical opening 41 may also include a plurality of radially inwardly extending teeth 47. The teeth 47 are configured to provide engagement with the outer surface of the body 101 of the fluid conduit 100. A widened end of the conically shaped plug seal 40 includes a radially outwardly extending flanged portion 42. As best shown in FIG. 7, the plug seal 40 has a split-collar construction, thereby allowing for the plug seal 40 to be easily installed over the outer surface of the body 101 of the fluid conduit 100. The plug seal 40 may be formed from a resilient or flexible material suitable for forming a substantially fluid-tight seal between the plug seal 40 and an abutting surface. The plug seal 40 may for instance be formed from rubber or a similar polymeric material, for example.

The structural panel 60 may further include a recess 78 formed therein having a semi-conical shape corresponding substantially to the shape of an outer surface of the conical portion of the plug seal 40. The recess 78 may further include a widened portion 79 corresponding to a shape of the flanged portion 42 of the plug seal 40. Accordingly, the plug seal 40 may be placed over the body 101 of the fluid conduit 100 and then pressed into the recess 78. The flanged portion 42 of the plug seal 40 is configured to preload the conically shaped outer surface of the plug seal 40 against the corresponding conically shaped recess 78, thereby tightly securing the plug seal 40 around the fluid conduit 100. The flanged portion 42 also aids in preventing the ingress of insects or other pests which might otherwise burrow into one of the channels 80. Additionally, the teeth 47 may "bite into" the body 101 of the fluid conduit 100, thereby providing an assured seal between the fluid conduit 100 and the plug seal 40. For additional sealing ability, a suitable adhesive or other suitable sealing material may be applied between the plug seal 40 and the fluid conduit 100 or the plug seal 40 and the structural panel 60, as desired.

Figure 8:
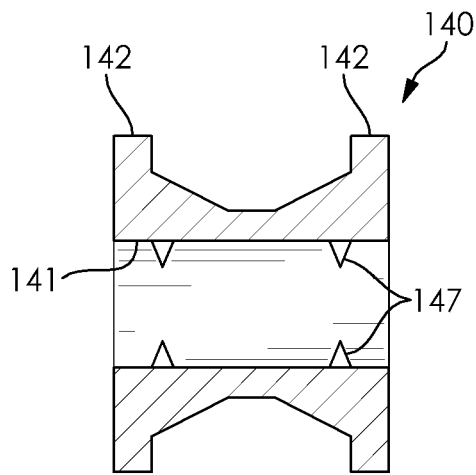
FIG. 8 is a cross-sectional side elevational view showing an alternative embodiment of the plug seal illustrated in FIGS. 6 and 7.

FIG. 8 illustrates a plug seal 140 according to another embodiment of the invention. The plug seal 140 has substantially the same configuration as the plug seal 40 illustrated in FIGS. 6 and 7 except the plug seal 140 is configured to straddle the connection points 70 of adjacent ones of the structural panels 60. Accordingly, the plug seal 140 includes a pair of oppositely arranged and radially outwardly extending flanged portions 142 formed at each end of the plug seal 140, and a pair of conically shaped portions each reducing in diameter toward a central portion of the plug seal 140. The plug seal 140 includes an opening 141 formed therethrough for receiving the body 101 of the fluid conduit 100. The plug seal 140 is also formed to have a split-collar construction to allow the plug seal 140 to be placed around the body 101 of the fluid conduit 100. The plug seal 140 may further include teeth 147 extending radially inwardly for providing a secure seal between the fluid conduit 100 and the plug seal 140. The plug seal 140 is installed into the recesses 78, including the widened portions 79, of adjacent ones of the structural panels 60, wherein the flanged portions 142 preload the conically shaped portions of the plug seal 140 against the conically shaped portions of the recesses 78 to ensure a secure seal. A suitable adhesive or other suitable sealing material may be applied between the plug seal 40 and the fluid conduit 100 or the plug seal 40 and the structural panel 60 to ensure a secure seal, as desired.

Figure 9:
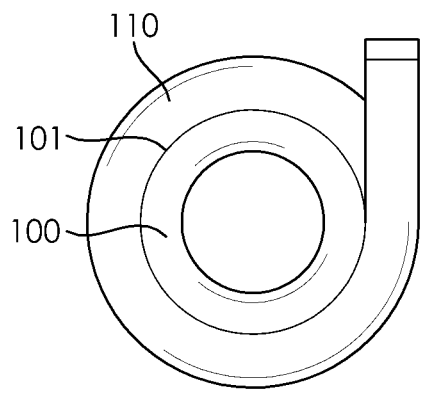
FIG. 9 is a front elevational view of a foam wrap for sealing each connection point formed in each of the structural panels.

FIG. 9 illustrates an alternative way to form a seal around the fluid conduit 100. A foam wrap 110 backed with adhesive tape may be wrapped around the body 101 of the fluid conduit 100. The foam wrap 110 may be similar to traditional weather stripping type foam. The foam wrap 110 may be formed from closed cell foam configured to prevent water ingress into one of the channels 80. The foam wrap 110 may have a substantially rectangular shape capable of being curled into a substantially cylindrical shape to fit around the body 101 of the fluid conduit 100. The foam wrap 110 is placed around the fluid conduit 100 and then the fluid conduit 100 and the foam wrap 110 are both placed into the channel 80 of one of the structural panels 60 at one of the connection points 70 thereof. The foam wrap 110 provides an interference fit blockage between the structural panel 60 and the fluid conduit 100, which provides assured sealing.

FIGS. 10A-10D illustrate a drip pan 54 configured to collect moisture that may accumulate on the functional panels 20. The moisture formed on the functional panels 20 may be from precipitation, melted snow or ice, or condensate that forms on the functional panels 20 during a cooling operation thereof. Removal of the moisture mitigates a slipping hazard forming on the functional panels 20. The drip pan 54 includes an inclined surface 56 that leads to a drain (not shown). The drip pan 54 is disposed beneath the structural panels 60 to allow any moisture accumulated on the functional panels 20 to be gravity fed past the structural panels 60 and toward the drip pan 54. The moisture is shown in FIGS. 10A-10D as a plurality of circular droplets falling toward the drip pan 54. The drip pan 54 may include a heating element 44 formed adjacent the inclined surface 56 for ensuring that any moisture accumulated within the drip pan 54 is directed toward the drain in liquid form or evaporated. The heating element 44 may be in signal communication with each of a controller 45 and a sensor 46. The sensor 46 may be configured to determine a condition of the drip pan 54 such as a temperature of the drip pan 54. The controller 45 may be configured to activate the heating element 44 when the sensor 46 determines that a condition of the drip pan 54 has occurred, such as the temperature of the drip pan 54 reaching a preselected value. In other embodiments, the controller 45 may be configured to activate the heating element 44 when prompted by the user or during predetermined time intervals that may be programmed into the controller 45. The controller 45 may also be remotely controlled. The remote control of the controller 45 may be accomplished using a mobile device having a suitable application and a suitable wireless communication method, such as Bluetooth®.

In order to facilitate the gravity feeding of the moisture toward the drip pan 54, each of the functional panels 20 illustrated in FIG. 10A includes a convex outer face 22 configured to direct the moisture to openings 58 formed between adjacent ends of the functional panels 20 and the structural panels 60, wherein the openings 58 are in fluid communication with the drip pan 54. FIG. 10B illustrates an alternative arrangement wherein each of the functional panels 20 includes an inclined outer face 22 sharing the same angle of inclination. The inclined outer face 22 of each of the functional panels 20 directs the moisture to one of the openings 58 formed between adjacent ends of the functional panels 20 and the structural panels 60. FIG. 10C illustrates an arrangement that is nearly identical to that of FIG. 10B except that adjacent pairs of the functional panels 20 include inclined outer faces 22 that lead to a common opening 58 formed therebetween. FIG. 10D illustrates an arrangement wherein the functional panels 20 have a substantially linear outer face 22 that is arranged substantially parallel to a ground surface (not shown), wherein each of the functional panels 20 and each of the structural panels 60 include a plurality of holes 59 formed therethrough and in fluid communication with the drip pan 54. Accordingly, moisture may flow directly from the outer face 22 of each of the functional panels 20, through each of the holes 59 formed through both the functional panels 20 and the structural panels 60, and into the drip pan 54.

Figure 11:
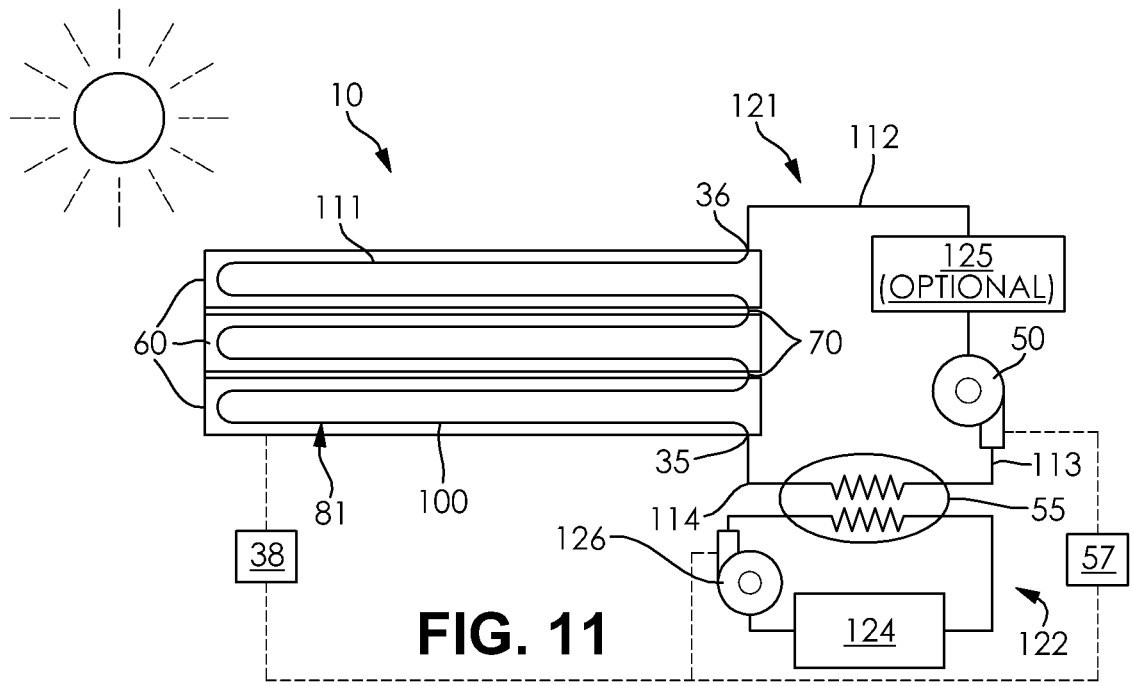
FIG. 11 is a schematic flow diagram of the temperature controlled structure assembly in heat exchange relationship with a secondary fluid circuit.

FIG. 11 schematically illustrates a representative application of the temperature controlled structure assembly 10. An array of the structural panels 60 is installed in a manner wherein the connection points 70 of adjacent ones of the structural panels 60 are aligned to form the continuous channel 81. The fluid conduit 100 is routed through the continuous channel 81, wherein the fluid conduit 100 enters the array of structural panels 60 at an inlet 35 and exits the array of structural panels 60 at an outlet 36. Although not pictured, an array of the functional panels 20 is installed over the array of structural panels 60 to cover the fluid conduit 100 and the continuous channel 81. Additionally, at least one of the plug seal 40, the plug seal 140, or the foam wrap 110 may be used to seal each of the connection points 70 of each of the structural panels 60.

The fluid conduit 100 forms a portion of a primary loop 121 of a first fluid line. The first fluid line includes a first segment 111 comprising the fluid conduit 100 extending from the inlet 35 to the outlet 36 along the continuous channel 81, a second segment 112 formed external to the fluid conduit 100 and extending between the outlet 36 and a pump 50, a third segment 113 formed external to the fluid conduit 100 and extending between the pump 50 and a heat exchanger 55, and a fourth segment 114 formed external to the fluid conduit 100 and extending between the heat exchanger 55 and the inlet 35. The pump 50 may be any known device suitable for mechanically moving the first fluid through the fluid conduit 100. The pump 50 may be in signal communication with a controller 57. The controller 57 may be configured to activate the pump 50 only when a surface of the functional panels 20 is above or below a predetermined temperature value or when a predetermined condition is met regarding the surface of the functional panels 20. Accordingly, the temperature controlled structure assembly 10 may be in communication with a sensor 38 configured to monitor a condition of the surface of the functional panels 20. The sensor 38 may accordingly be a temperature sensor which communicates with the controller 57 to determine when the pump 50 is activated. As such, the controller 57 may be preprogrammed to only activate the pump 50 at a certain temperature in accordance with a desired comfort level of the user. The sensor 38 may alternatively be used to determine other conditions of the functional panels 20 such as whether moisture is present or whether the functional panels 20 are currently exposed to sun light, as non-limiting examples. The first fluid may be contained entirely within the conduits or piping forming the primary loop 121 or the primary loop 121 may optionally include a fluid reservoir 125 in fluid communication with the fluid conduit 100 for supplying the first fluid. In some embodiments, the reservoir 125 may be replaced with a fluid tower (water tower) or other similar structure. The fluid tower may be used to store a quantity of the first fluid at a suitable height for pressurizing the first fluid prior to the introduction of the first fluid into the continuous channel 81. In such an arrangement, the pump 50 may be disposed upstream of the fluid tower acting as the fluid reservoir 125 in contrast to the arrangement shown in FIG. 11. The pump 50 may therefore be used to pump the first fluid to the required height within the fluid tower to adequately pressurize the first fluid. The use of a fluid tower advantageously saves energy when operating the temperature controlled structure assembly 10 by eliminating continuous operation of the pump 50 to direct the first fluid through the primary loop 121. Instead, the pump 50 is operated only during the filling process of the fluid tower, and subsequent operation of the temperature controlled structure assembly 10 may be performed by allowing the pressurized first fluid to flow out of the fluid tower and through the primary loop 121.

The fluid conduit 100 may be formed to be continuous with no intervening fluid connections formed between the inlet 35 and the outlet 36 along the first segment 111. Accordingly, the continuously formed portion of the fluid conduit 100 extending along the first segment 111 may be routed into the continuous channel 81 and secured thereto via the tabs 102 without requiring the use of multiple segments of piping or conduits. The installation process is therefore greatly simplified as multiple fluid connections are not required to be made within the internal structure of the temperature controlled structure assembly 10.

The heat exchanger 55 includes a portion of the first fluid line along the primary loop 121 in heat exchange relationship with a secondary loop 122. The secondary loop 122 is in fluid communication with a heating or cooling source 124. The heating or cooling source 124 may for example be a fluid reservoir, as desired. A second fluid is caused to flow from the heating or cooling source 124 and through the secondary loop 122 to exchange heat energy with the first fluid flowing through the fluid conduit 100. The second fluid may be caused to flow through the secondary loop 122 by a pump 126 or other similar device, as desired. The pump 126 may be in signal communication with the controller 57, wherein the controller 57 is configured to activate the pump 126 when required.

In use, the pump 50 is activated by the user or by the controller 57 when the sensor 38 determines that a preselected condition of the functional panels 20 has been met. The activation of the pump 50 causes the first fluid to flow from the pump 50 and through the heat exchanger 55. The user or the controller 57 may also optionally activate the pump 126 to ensure that the second fluid is caused to circulate through the secondary loop 122. When in the heat exchanger 55, the first fluid exchanges heat energy with the second fluid. The first fluid then flows from the heat exchanger 55 and to the inlet 35. The first fluid then flows through the fluid conduit 100 along the continuous channel 81 while exchanging heat energy with the functional panels 20 and the structural panels 60, thereby heating or cooling the exposed functional panels 20 depending on the temperature of the first fluid relative to the temperature of the functional panels 20. The first fluid then flows out of the array of structural panels 60 via the outlet 36 before reentering the pump 50 and undergoing another cycle through the primary loop 121. As explained hereinabove, the first fluid may also flow into or originate from a fluid reservoir in fluid communication with the pump 50, as desired.

The arrangement shown in FIG. 11 may be used for a variety of applications. The temperature controlled structure assembly 10 may for example be used to cool a boardwalk or other similar structure disposed adjacent to a body of water such as an ocean, a pond, a lake, or the like. In many instances, the boardwalk or a similar structure may become excessively hot following a period of exposure to sunlight, thereby making it uncomfortable for a person to walk over the boardwalk, especially when barefoot. Additionally, it should be understood that a large body of water, such as the ocean, typically has a much lower temperature following exposure to the sun than a structure such as a boardwalk undergoing the same exposure.

Accordingly, the body of water may form the heating or cooling source 124 forming the portion of the secondary loop 122 and the second fluid may be ocean water, pond water, river water, or lake water having a temperature lower than the temperature of the functional panels 20 forming the boardwalk. In contrast, the first fluid flowing through the first fluid line of the primary loop 121 may be a fluid such as brine, fresh water, a glycol-water mix, or oil that has been filtered or otherwise provided with a low level of contaminants or debris that may cause damage to any part of the temperature controlled structure assembly 10. The heat exchanger 55 may therefore be utilized in place of directly pumping the ocean water, pond water, river water, or lake water through the first fluid line and the fluid conduit 100 to prevent the introduction of debris present in the body of water which may cause failure of the temperature controlled structure assembly 10. The use of the heat exchanger 55 therefore removes the need for the installation of additional filtration devices or the use of additional disinfecting solutions or components. The temperature controlled structure assembly 10 therefore advantageously takes advantage of the naturally occurring difference in temperature between the body of water and the functional panels 20, thereby allowing for the cooling of the functional panels 20 without the need for any additional refrigeration devices that may otherwise require additional energy to be supplied to the temperature controlled structure assembly 10.

The heat exchanger 55 illustrated in FIG. 11 may be replaced with any heat exchanging device such as a heating device (not shown) or a cooling device (not shown) if the use of a secondary loop 122 and the second fluid is not required. The first fluid line of the primary loop 121 may be in fluid communication with the heating or cooling device in a manner wherein the first fluid exits the heating or cooling device with a higher or lower temperature than when it entered the heating or cooling device. Accordingly, the heating or cooling device may be used to directly heat or cool the first fluid in order for the first fluid to be used to heat or cool the functional panels 20. The heating or cooling device may accordingly be disposed along any portion of the primary loop 121 with the exception of the first segment 111 comprising the fluid conduit 100. If a heating device is used, the heating device may be a boiler, a heat pump, an electrical heater, or a device configured to utilize solar energy to produce heat. The boiler may be fueled by heating oil or natural gas, for example, as desired. The electrical heater may be resistance type or positive temperature coefficient (PTC) type. As one representative example, the temperature controlled structure assembly 10 illustrated in FIG. 11 may be adapted for use with a hot water heater disposed near the arrays of the structural panels 60 and the functional panels 20. The hot water heater may for example be associated with a home or building structure disposed adjacent an exposed portion of decking or other similar structures forming a portion of the temperature controlled structure assembly 10, as a non-limiting example. The hot water heater may act as both the fluid reservoir 125 and the heat exchanger 55, wherein water present within a reservoir of the hot water heater is heated by traditional methods within the hot water heater before the water is directed toward the arrays of the structural panels 60 and the functional panels 20. Once heat energy from the water has been exchanged with the functional panels 20 to heat the functional panels 20, the water may then be redirected to the water reservoir of the hot water heater to repeat the heating process, thereby recycling the water for additional cycles of heating the functional panels 20. As should be understood, the use of the hot water heater as the heat exchanger 55 may eliminate the need for the secondary loop 122 having the second fluid. Alternatively, the hot water heater may instead form a portion of the secondary loop 122. For example, the water reservoir of the hot water heater may form the heating or cooling source 124 and the water heated by the hot water heater may be directed through the heat exchanger 55 as the second fluid. The heated water as the second fluid then exchanges heat with the first fluid flowing through the primary loop 121. Such an arrangement may be used when the first fluid flowing the primary loop 121, such as glycol or brine, is not suitable for introduction into the hot water heater directly as such a fluid may cause damage to the hot water heater. If a cooling device is used, the cooling device may be a chiller or an air conditioning system, for example, as desired. The chiller may for instance use a supply of ice to cool the first fluid. In addition to those heating devices and those cooling devices disclosed herein, it should be understood that any suitable heating or cooling device suitable for heating or cooling a circulating fluid may be used, as desired.

Figure 12:
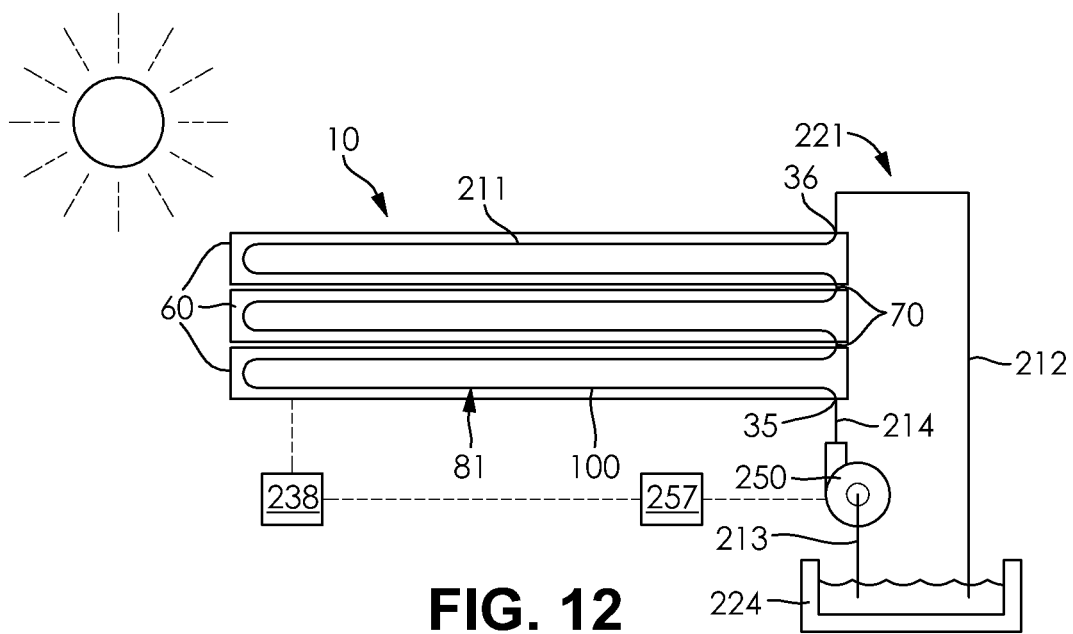
FIG. 12 is a schematic flow diagram of the temperature controlled structure assembly in fluid communication with a fluid source.

FIG. 12 schematically illustrates an alternative arrangement of the temperature controlled structure assembly 10. The array of the structural panels 60 is identical to that shown in FIG. 11 and includes the continuous channel 81 having the inlet 35 and the outlet 36. In similar fashion to FIG. 11, the functional panels 20 have been omitted from FIG. 12 for clarity, but the functional panels 20 are preferably disposed over the array of the structural panels 60 following assembly thereof. The fluid line forms a primary loop 221 including a first segment 211 including the fluid conduit 100 and extending from the inlet 35 to the outlet 36 along the continuous channel 81, a second segment 212 formed external to the fluid conduit 100 and extending between the outlet 36 and a fluid source 224, a third segment 213 formed external to the fluid conduit 100 and extending between the fluid source 224 and a pump 250, and a fourth segment 214 formed external to the fluid conduit 100 and extending between the pump 250 and the inlet 35. The pump 250 may be any known device suitable for mechanically moving the first fluid through the fluid line. The pump 250 may be controlled by a controller 257. The controller 257 may be in signal communication with a sensor 238 configured to determine a condition of the functional panels 20 to determine when the pump 250 is activated.

In use, the pump 250 is activated by the user or by the controller 257 when a preselected condition of the functional panels 20 is met. The pump 250 causes the first fluid to flow from the fluid source 224 and to the inlet 35 where the first fluid flows through the fluid conduit 100 along the continuous channel 81. The first fluid exchanges heat energy with the functional panels 20 and the structural panels 60, thereby heating or cooling the exposed functional panels 20 depending on the temperature of the first fluid relative to the temperature of the functional panels 20. The first fluid then flows out of the array of structural panels 60 via the outlet 36 before reentering the fluid source 224 and then the pump 250. The first fluid then continues to circulate through the primary loop 221 while continuously exchanging heat energy with the functional panels 20.

The arrangement illustrated in FIG. 12 may be used for a variety of applications. The temperature controlled structure assembly 10 may for example be used to cool a pool-side deck or other similar structure disposed adjacent a swimming pool. In many instances, the deck may become excessively hot following a period of exposure to sunlight, thereby making it uncomfortable for a person to walk over the deck, especially when barefoot. The water contained within the swimming pool typically has a significantly lower temperature than the surface of the deck.

Accordingly, the deck may be formed from the array of the structural panels 60 and functional panels 20 and the fluid source 224 may be formed from the swimming pool. The exposed functional panels 20 forming the deck surface may be provided to have a dark color suitable for absorbing solar rays. In contrast to the use of ocean water, pond water, river water, or lake water, many swimming pools include filtration devices or de-contaminating agents that continuously clean the water contained within the swimming pool. Accordingly, the water contained within the swimming pool may be circulated directly through the fluid conduit 100 without the need of an additional heat exchanger or heating/cooling device. This arrangement advantageously allows for the cooler water contained within the swimming pool to be used to cool the functional panels 20. As the pool water cools the functional panels 20, the heat energy from the functional panels 20 is provided to the pool water, causing the pool water exiting the fluid conduit 100 at the outlet 36 to have a higher temperature than the pool water at either of the fluid source 224 (swimming pool) or the inlet 35. Accordingly, the pool water re-enters the fluid source 224 (swimming pool) at a higher temperature, thereby aiding in heating the pool water. As such, the arrangement shown in FIG. 12 both cools the deck formed from the functional panels 20 while simultaneously heating the swimming pool via the circulation of the pool water.

Additionally, the use of the swimming pool as the fluid source 224 may aid in heating the deck formed from the structural panels 60 and the functional panels 20 during extended periods of non-exposure to the sun. For example, during nighttime hours the functional panels 20 of the deck may eventually reach a temperature that is lower than that of the water contained within the swimming pool. As such, the water from the swimming pool may be continually circulated through the deck to aid in heating the deck, thereby improving the comfort of a user walking on the deck during the nighttime hours.

In some circumstances the user may desire to not circulate the pool water through the temperature controlled structure assembly 10. In such circumstances, the swimming pool may instead take the place of the fluid source 124 in the arrangement shown in FIG. 11, allowing for heat energy to be exchanged between the pool water and another fluid caused to circulate through the primary loop 121. In such an arrangement it may further be useful to install an indirect heat transferring tank or vessel, as desired.

Although not pictured in FIG. 12, a heating or cooling device similar to those described with reference to FIG. 11 may be included in the primary loop 121 at any point outside of the first segment 111 formed between the inlet 35 and the outlet 36. The heating or cooling device may be configured to further aid in heating or cooling the first fluid originating from the fluid source 224, as desired.

Figure 13:
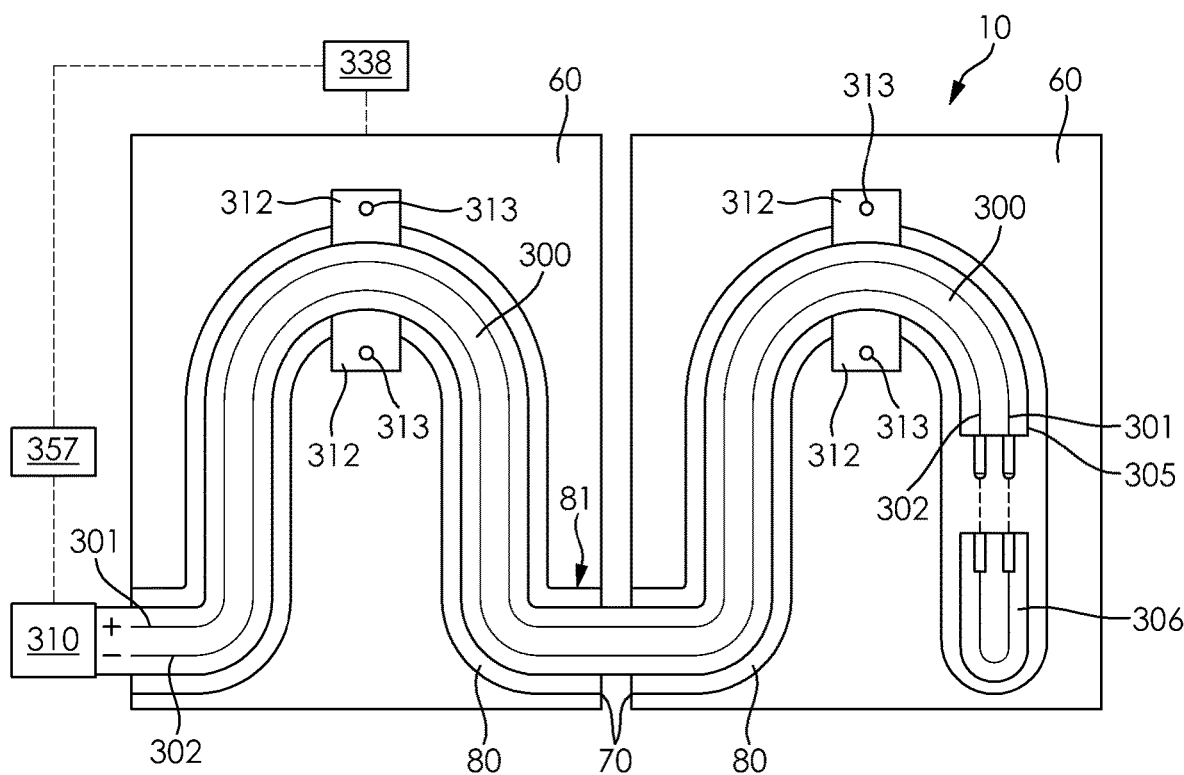
FIG. 13 is a top plan view of the temperature controlled structure assembly including an electrical element according to an embodiment of the invention.
Figure 14:
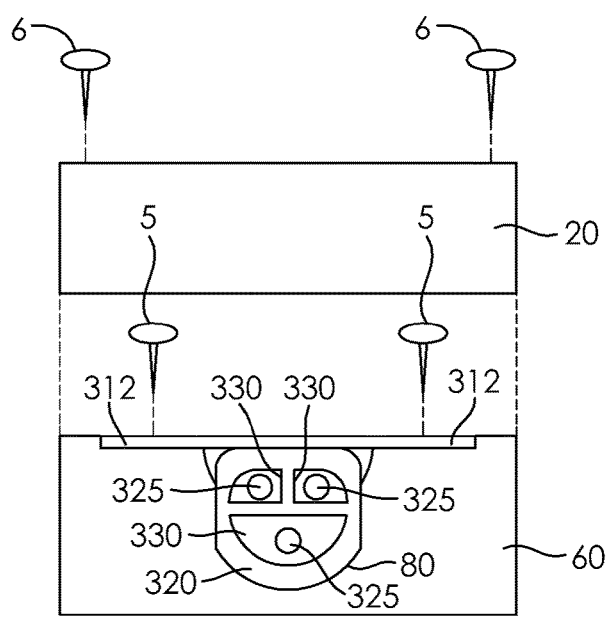
FIG. 14 is a partially exploded front elevational view of the electrical element illustrated in FIG. 13.

Referring now to FIGS. 13-15, the temperature controlled structure assembly 10 may further be adapted for use with a heat exchanging element in the form of the electrical element 300, wherein the electrical element 300 is an electrical device capable of radiating or conducting heat energy to or from an adjacent or adjoining surface, such as surfaces of the functional panels 20 or the structural panels 60. The electrical element 300 is configured to be disposed within and routed throughout the continuous channel 81 formed by the cooperation of the array of the structural panels 60 forming the temperature controlled structure assembly 10. The electrical element 300 may in similar fashion to the fluid conduit 100 be formed from a flexible wire or other flexible electrical device that is capable of being routed through a variety of different bends or turns of the channels 80. Alternatively, the electrical element 300 may be formed from a substantially inflexible component having a shape and size suitable for being fit within the continuous channel 81 of the temperature controlled structure assembly 10. If an inflexible component is used, it should be understood that the inflexible component may require a cross-sectional shape corresponding to a cross-sectional shape of the channels 80 formed in the structural panels 60 and a profile substantially corresponding to a peripheral shape of the continuous channel 81 to allow the inflexible component to be fitted to the specific pattern of the continuous channel 81 including any bends or turns formed therein.

The electrical element 300 may include any suitable devices for either heating and/or cooling the structural panels 60 and the functional panels 20 forming the temperature controlled structure assembly 10. The electrical element 300 may accordingly include a thermoelectric element such as a solid state electrical resistance heater or a Peltier effect refrigeration element, as non-limiting examples. In some instances, the electrical element 300 may include two or more electrical components disposed therein such as a combination of a solid state electrical resistance heater and a Peltier effect refrigeration element within the same element to provide for combined heating and cooling modes. Accordingly, the electrical element 300 may be configured for heating or cooling the functional panels 20, as desired, depending on the type of electrical element 300 used.

As best shown in FIG. 14, the electrical element 300 may include a housing 320 having at least one chamber 330 formed therein and extending along a length of the electrical element 300. The housing 320 may be formed from a flexible material also capable of conducting heat energy therethrough. Each of the at least one chambers 330 may be configured to house at least one electrical component 325 therein. The electrical component 325 may in some circumstances be an electrical heating and/or cooling device entirely disposed within one of the chambers 330 or the electrical component 325 may be only a wire or other electrical connecting device associated with another electrical component 325 disposed within another one of the chambers 330. The housing 320 may also be formed to be electrically insulating along some regions thereof to prevent electrical interference between one of the chambers 330 and another. In some cases, the electrical element 300 may be formed to not include a housing 320. Instead, the electrical element 300 may be formed from an electrical component 325 requiring no additional insulation or interfacing formed between the electrical component 325 and the surface of the structural panels 60 and the functional panels 20 bounding each of the channels 80.

FIG. 13 illustrates an array of two of the structural panels 60 arranged to form a continuous channel 81. The electrical element 300 includes both a positive lead 301 and a negative lead 302 disposed therein and extending along a length of the electrical element 300, as shown schematically in FIG. 13. The positive lead 301 and the negative lead 302 may be routed through the same or separate chambers 330 formed within the electrical element 300. The positive lead 301 and the negative lead 302 are each electrically connected to a power source 310 configured to provide electrical energy to the electrical element 300 in order to produce a desired current through the electrical element 300. The power source 310 may be an electrical outlet or a battery, as non-limiting examples.

The electrical element 300 illustrated in FIG. 13 is flexible and capable of being routed through each of the turns of the continuous channel 81, which is illustrated as having a series of U-shaped turns formed between adjacent ones of the structural panels 60. A distal end 305 of the electrical element 300 includes an end turnaround segment 306. The end turnaround segment 306 connects the positive lead 301 to the negative lead 302 to form a complete loop including the power source 310. Accordingly, the electrical element 300 may be caused to perform a heating function and/or a cooling function, depending on the type of electrical element 300 used and the preferred operational mode thereof (if the electrical element 300 is configured to perform both a heating and a cooling operation). Although the electrical element 300 is shown in FIG. 13 as having a single positive lead 301 and a single negative lead 302, the electrical element 300 may be formed to include additional wiring for two or more electrical devices and each separate pairing of electrical components may be configured to be connected with the inclusion of the end turnaround segment 306. For example, the electrical element 300 may be formed to include wiring for both an electrical resistance heater and a Peltier effect refrigerator unit, each potentially disposed in different chambers 330 of the electrical element 300, for combined heating and cooling capabilities from a single routing of the electrical element 300.

As illustrated in FIGS. 13-15, the electrical element 300 may include a plurality of flanged portions in the form of tangentially outwardly extending tabs 312. The tabs 312 may include a plurality of apertures 313 formed therein for securing the electrical element 300 to the structural panels 60. The tabs 312 may be formed integrally with the housing 320 of the electrical element 300 or the tabs 312 may be formed separately and then coupled to the remainder of the electrical element 300 or the housing 320 thereof. In either circumstance, the flexibility of the electrical element 300 and the use of the tabs 312 allow for the electrical element 300 to be routed within the continuous channel 81 and secured to the structural panels 60 in almost identical fashion to the fluid conduit 100. Accordingly, it should be understood that the electrical element 300 may be used in place of the fluid conduit 100 as shown and described in FIGS. 1-12 while remaining within the scope of the present invention.

Furthermore, the use of a housing 320 having a plurality of chambers 330 formed therein allows for one of the chambers 330 of the housing 320 to act as the continuous fluid conduit 100. Accordingly, the temperature controlled structure assembly 10 may be configured for both fluid circulation and electrical heating or cooling within the same structure. In other embodiments, the continuous channel 81 may be formed to have a cross-section suitable for receiving each of a fluid conduit 100 and one of the electrical elements 300 therein, separately and distinctly.

The power source 310 of the electrical element 300 may be associated with or in signal communication with a controller 357. The controller 357 may for instance be a thermostat or other similar device used to activate or provide power to the electrical element 300 when a sensor 338 associated with the temperature controlled structure assembly 10 detects that a preselected condition has been met, such as the temperature of the functional panels 20 reaching a preselected temperature. The controller 357 controls the power source 310 to control the use of the electrical element 300. The controller 357 may further include a push button interface (not shown) for allowing the user to select desired settings and to pre-program the controller 357. In other embodiments, the controller 357 may be controlled via remote control. One method of remotely controlling the controller 357 may include the use of a mobile device application configured to communicate wirelessly with the controller 357. The mobile device application may for instance communicate with the controller 357 via Bluetooth®, as a non-limiting example. Other wireless methods of communication may be used as desired.

FIG. 15 illustrates an alternative embodiment of the electrical element 300, wherein the electrical element 300 is divided into a plurality of electrical segments 340 each having a mating feature 345 disposed at each end thereof for connecting the positive lead 305 and the negative lead 306 of each of the electrical segments 340 to each other. The mating feature 345 may be any known form of electrical connector suitable for forming an electrical connection. After the mating features 345 of the adjacent electrical segments 340 are coupled to each other, a piece of electrical tape or a weatherproof sheath, such as the foam wrap 110, may be placed over the intersection of the electrical segments 340 to protect the electrical element 300 from moisture or other potential damaging agents. Each of the electrical segments 340 illustrated in FIG. 15 extends along the channel 80 of a single one of the structural panels 60, causing each of the electrical segments 340 to adjoin an adjacent one of the electrical segments 340 at the peripheral edge 65 of each of the structural panels 60. The plurality of electrical segments 340 are combined end to end to form one electrical element 300 having an end suitable for receiving one of the end turnaround segments 306 to complete the circuit with the power source 310.

The use of the plurality of electrical segments 340 allows for the electrical segments 340 to be incorporated into the structural panels 60 as a single unit. For example, each of the structural panels 60 may have a desired size and shape for forming a desired structure and each of the structural panels 60 may have one of the electrical segments 340 securely coupled thereto and terminating at the mating features 345 at each end thereof. As shown in FIG. 15, each of the structural panels 60 may be selected such that each of the electrical segments 340 disposed therein are properly configured to be aligned and mated with the electrical segment 340 or segments 340 of an adjacent one of the structural panels 340. Accordingly, instead of routing one continuous fluid conduit 100 or electrical element 300 through the continuous channel 81 the use of the plurality of the electrical segments 340 allows for the heating or cooling device and the structural panels 60 to be installed in a single operation. One of the end turnaround segments 306 may be mated to the final electrical segment 340 to form a complete circuit including the power source 310. Accordingly, it should be understood that the structural panels 60 selected for forming the temperature controlled structure assembly 10 may be selected to have certain lengths or channel patterns to accommodate the installation of a desired structure.

It should further be understood that the housing 320 of the electrical element 300 may be disposed through any of the plug seal 40, the plug seal 140, or the foam wrap 110 at each of the connection points 70 to adequately seal the electrical element 300 from encroachment from environmental factors such as the introduction of moisture or the entry of a pest such as an insect.

One potential advantage of the use of the electrical element 300 in place of the fluid conduit 100 is that the electrical element 300 can be routed into the array of the structural panels 60 through a single entry point in the form of one of the connection points 70 formed in one of the structural panels 60 formed at a peripheral edge thereof facing outwardly from the array. The use of a single entry point into the array reduces a complexity of an assembly process of the temperature controlled structure assembly 10.

Although the temperature controlled structure assembly 10 has thus far been described as being used in building structures having a substantially planar arrangement of the functional panels 20 and the structural panels 60, it should be understood that the temperature controlled structure assembly 10 may be used in a variety of 3-dimensional configurations due to the flexibility of design available with the use of a structural panels 60 having a variety of different sizes, shapes, and configurations of channels 80 formed therein.

For example, FIG. 16 illustrates the temperature controlled structure assembly 10 having the configuration of a traditional staircase 31. Each step 32 of the staircase 31 is formed from at least one of the structural panels 60 formed into a planar structure and spaced apart from an adjacent one of the steps 32 in a vertical direction. FIG. 16 illustrates each of the steps 32 as being formed from three of the structural panels 60, but other configurations may be used without departing from the scope of the present invention. The fluid conduit 100 (which is illustrated schematically in FIG. 16) is routed through each of the channels 80 formed in each of the steps 32 and further extends between adjacent ones of the steps 32 in the form of a plurality of fluid connections 108. As explained hereinabove, the fluid conduit 100 is formed from one continuous conduit having no intervening connections or coupling features to ensure that no leaks or faulty connections are able to form between the inlet 35 of the array of the structural panels 60 and the outlet 36 of the array of structural panels 60. Accordingly, each of the fluid connections 108 is merely a portion of the fluid conduit 100 that is routed nearly vertically outside of the horizontally arranged steps. As shown in FIG. 16, the fluid connections 108 may be routed through a nearly vertically arranged structural panel 60. The structural panel 60 may be an end panel 109, wherein the end panel 109 includes a vertically arranged or diagonally arranged channel 80 suitable for routing the fluid conduit 100 nearly vertically or diagonally at each of the fluid connections 108.

The staircase 31 may further include a rail 135 formed from one or more of the structural panels 60 having a channel 80 formed therein for routing the fluid conduit 100 therein. The fluid conduit 100 may for example be routed from the outlet 36 and to the rail 135 using one of the fluid connections 108. It should be understood that the structural panel 60 forming the rail 135 in FIG. 16 includes at least one functional panel 20 disposed thereover (not shown). The rail 135 may accordingly be cooled or heated using the fluid conduit 100. The rail 135 may accordingly be configured to heat or cool the hand of the user in accordance with a desired comfort level of the user or to thaw any snow or ice that may accumulate on the rail 135.

Because the fluid conduit 100 is formed as one continuous conduit without intervening connectors or divisions, formation of the staircase illustrated in FIG. 16 preferably includes first installing each of the structural panels 60 in the desired configuration to form each of the steps 32. Next, the continuous fluid conduit 100 is routed through each of the channels 80 of each of the structural panels 60 forming the steps 32 from the inlet 35 to the outlet 36, including routing the fluid conduit 100 vertically at each of the fluid connections 108. Once the fluid conduit 100 is properly positioned and secured to the structural panels 60, the functional panels 20 may be disposed over the structural panels 60 and coupled thereto. If used, the end panels 109 may also be installed to the side surfaces of the structural panels 60 to enclose the fluid conduit 100 between each of the adjacent steps 32. As should be understood, the staircase form of the temperature controlled structure assembly 10 may be adapted for use with the arrangement illustrated in FIG. 11 or the arrangement illustrated in FIG. 12, as desired. The temperature controlled structure assembly 10 may be adapted for use with any fluid system capable of supplying the first fluid to the inlet 35 and receiving the first fluid from the outlet 36.

Additionally, instead of the fluid conduit 100, the temperature controlled structure assembly illustrated in FIG. 16 may instead utilize the electrical element 300, which may be routed through the continuous channel 81 in the same fashion as the fluid conduit 100. The electrical element 300 may also similarly be routed vertically to connect each adjacent one of the steps 32 forming the staircase 31.

Although not pictured, it should be understood that the temperature controlled structure assembly 10 may further be adapted for use in a ramp or other similar structure suitable for being traversed by a wheelchair or motorized vehicle. The ramp may be produced by installing an array of the structural panels 60 and the functional panels 20 at an angle relative to the ground surface or the underlying structural frame 12. The ramp may for instance have the form of the three structural panels 60 illustrated in FIG. 2 and arranged at an angle relative to the ground surface.

FIG. 17 illustrates the temperature controlled structure assembly 10 having the configuration of a compact spiral staircase 33 formed from a plurality of steps 34. Each of the steps 34 of the spiral staircase is formed from a substantially wedge-shaped or pie-shaped structural panel 60 having a winding channel 80 formed therein. Alternatively, each of the steps 34 may be formed from a plurality of the structural panels 60, as desired. Each of the connections points 70 of the winding channel 80 are formed along a portion of each of the structural panels 60 configured to be mounted to a vertically arranged support column 103. The support column 103 is hollow and includes a plurality of openings 104 formed in an outer surface thereof. In some instances, an access port 115 may be formed in the support column 103 opposite each of the openings 104. The access port 115 is configured to allow for access to an interior of the support column 103 when a user desires to manipulate those components of the spiral staircase 33 extending through the support column 103. Each of the access ports 115 may be covered by a removable access cap 105 configured to conceal the internal components of the spiral staircase 33 contained within the support column 103. The structural panels 60 are spaced apart from one another along a length of the support column and are spaced angularly about the support column to form a helical pattern of the structural panels 60, thereby creating a helical pattern of the steps 34 forming the spiral staircase 33.

The spiral staircase 33 is installed by first routing the fluid conduit 100 (which is shown schematically in FIG. 17) through the hollow support column 103 before then routing the fluid conduit 100 out of one of the openings 104 and into the channel 80 of one of the structural panels 60. The fluid conduit 100 is secured within the channel 80 of the structural panel 60 and is then rerouted back into the support column 103 via the same one of the openings 104. The fluid conduit 100 extends between adjacent ones of the openings 104 in the form of one of the fluid connections 108. One or more of the functional panels 20 may then be disposed over each of the structural panels 60 forming the steps 34 and the entire structure forming each step 34, including the functional panels 20 and structural panels 60, may then be coupled to the support column 103. The fluid conduit 100 is then routed to the next adjacent one of the openings 104 and the process is repeated until the spiral staircase 33 is complete. In similar fashion to the traditional staircase 31, the spiral staircase 33 may be formed using one continuous fluid conduit 100 extending between the inlet 35 and the outlet 36. Additionally, the spiral staircase configuration of the temperature controlled structure assembly 10 may be adapted for use with the arrangement illustrated in FIG. 11 or the arrangement illustrated in FIG. 12, as desired. The temperature controlled structure assembly 10 may be adapted for use with any fluid system capable of supplying the first fluid to the inlet 35 and receiving the first fluid from the outlet 36.

Additionally, instead of the fluid conduit 100, the temperature controlled structure assembly illustrated in FIG. 5 may instead utilize the electrical element 300, which may be routed through the continuous channel 81 in the same fashion as the fluid conduit 100. The electrical element 300 may also similarly be routed vertically through the support column 103 to connect each adjacent step 34 forming the spiral staircase 33.

The structural panels 60 and the functional panels 20 may also be configured into a bench or other seating surface. In similar fashion to the traditional staircase 31, the seating surface may be in the form of at least one of the structural panels 60 coupled to at least one of the functional panels 20 and spaced apart from a remainder of the structure in a vertical direction. Accordingly, the seating surface may be connected to the remainder of the assembly by means of one of the connections 108 extending between different portions of the structure.

Figure 18:
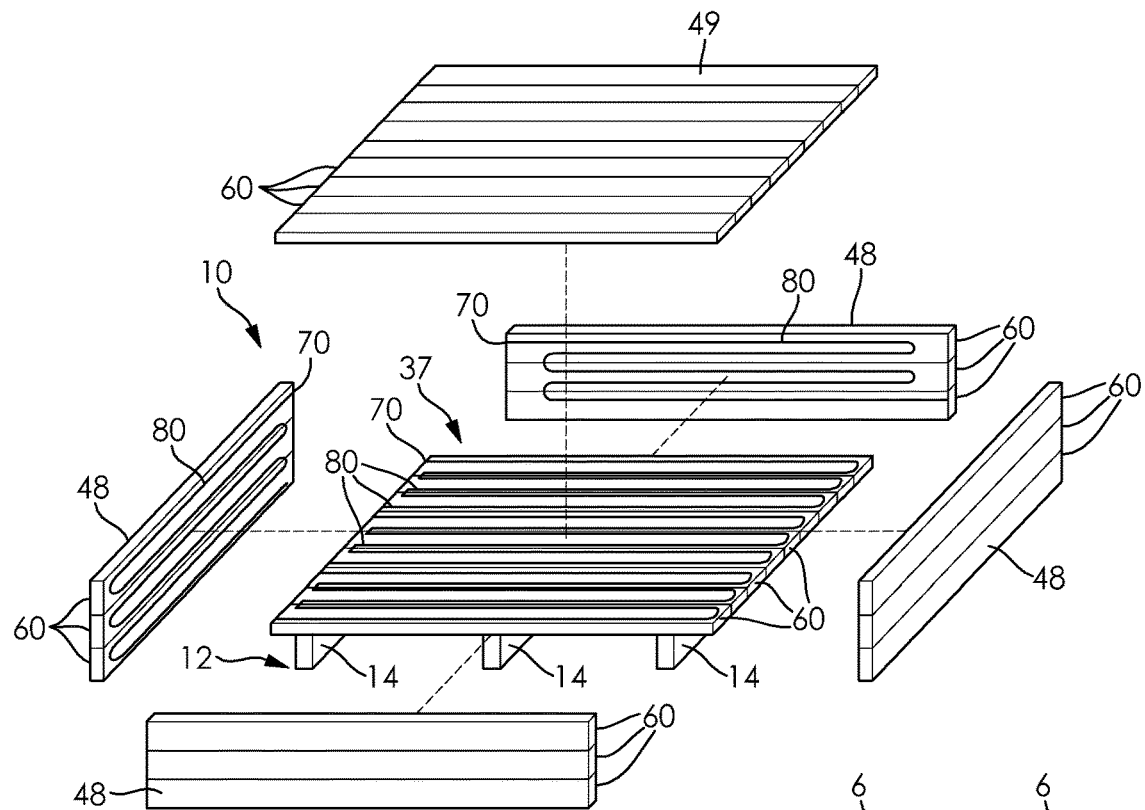
FIG. 18 is an exploded perspective view illustrating the temperature controlled structure assembly arranged into a shape of a pallet or crate.

FIG. 18 illustrates the temperature controlled structure assembly 10 having the configuration of a pallet 37. The pallet 37 includes a planar array of the structural panels 60 disposed on a plurality of spaced apart cross-members 14 forming the structural frame 12 of the pallet 37. Although not pictured, it should be understood that at least one of the functional panels 20 is subsequently coupled to the array of the structural panels 60 to cover each of the channels 80 formed therein. The pallet 37 may be configured for use with the fluid conduit 100, the electrical element 300, or a combination thereof, as desired.

The pallet 37 may be used to mitigate against the formation of frost on an article disposed on the pallet 37. For example, the pallet 37 may be configured to support a plurality of plants in need of heating, such as a plurality of flowers. Accordingly, the channels 80 of the structural panels 60 forming the pallet 37 may receive the electrical element 300 having a heating function therein or the channels 80 may receive the fluid conduit 100 when the fluid conduit 100 is connected to a heating source similar to the arrangement shown in FIG. 11. The fluid conduit 100 or the electrical element 300 may therefore be used to heat the plants, thereby reducing the formation of damaging frost on the plants. In addition to the heating function, the pallet 37 may alternatively be configured to cool an article disposed on the pallet 37, as desired.

As shown in FIG. 18, the pallet 37 may further be configured into a crate structure with the addition of a plurality of sidewalls 48 and a lid 49. The sidewalls 48 and the lid 49 are illustrated as being formed from a plurality of the structural panels 60 having the channels 80 formed therein. The sidewalls 48 and the lid 49 are shown as being comprised only of the structural panels 60, but it should be understood that the structural panels 60 may subsequently be covered with at least one of the functional panels 20 to conceal the channels 80 formed therein, as desired. Additionally, in some embodiments the sidewalls 48 and the lid 49 may not include a layer of the structural panels 60, but instead may be comprised exclusively of functional panels 20 used to enclose an interior the crate. It should also be understood that the crate structure may be formed without the use of the cross-members 14 forming the structural frame 12 of the crate structure. Instead, the crate may be comprised only of the five or six surfaces enclosing the interior of the crate structure, as desired.

The sidewalls 48 and the lid 49 may each be formed to have corresponding connection points 70 allowing the channels 80 formed in the different surfaces of the crate to form a continuous channel 81 through the base of the pallet 37, the sidewalls 48, and the lid 49, as desired. Accordingly, the crate may be formed into a configuration where an article contained within the crate is surrounded on multiple sides by the structural panels 60 having at least one of the fluid conduit 100 or the electrical element 300 disposed therein. The crate may accordingly be used to heat or cool the article contained therein, as desired.

In some embodiments, a plurality of the pallet structures 37 or a plurality of the crate structures may be arranged adjacent each other and configured for use with a plurality of the electrical elements 300. Preferably, each of the electrical elements 300 may branch out from a common power source before being routed to one of the pallet or crate structures. Accordingly, a single power source may be used to heat a plurality of the pallet or crate structures concurrently by simply "plugging in" each of the pallet or crate structures to the associated power source. This feature may be suitable for the heating (or cooling, as desired) of a plurality of shipping containers or the like formed into the pallet structure or the crate structure when such containers are in need of heating, especially at some point during a delivery process thereof. For example, such shipping containers may accordingly be formed into a sea container suitable for being stored and transported in a vessel suitable for use in or on navigable waters, wherein the phrase "navigable waters" refers to any body of water capable of affording passage to a boat, ship, or other water-based craft. The sea container may accordingly be heated or cooled during shipment thereof while the sea container is stored within such a vessel. The sea container may for example be stored within a hull of a merchant vessel used to navigate an ocean, sea, river, lake, or other navigable body.

The sea container may alternatively be adapted for use with the fluid conduit 100 in place of the electrical element 300. The fluid conduit 100 may be routed through each of the channels 80 of several adjacent structural panels 60 meeting at corresponding connection points 70. In some embodiments, the fluid conduit 100 may be routed from one of the sea containers to an adjacent one of the sea containers, thereby eliminating the need for additional fluid connections that may be subject to leaks or failure. In other embodiments, each of the sea containers may have a separately formed one of the fluid conduits 100 routed therethrough and independently operated. In either embodiment, each of the sea containers may be utilized in a system similar to that shown in either of FIGS. 11 and 12. If the arrangement of FIG. 11 is used, the navigable body on which the sea container is being transported may act as the heating or cooling source 124 and the water of the navigable body of water may act as the second fluid. The heat exchanger 55 may therefore be used to exchange heat energy between the first fluid flowing through the fluid conduit 100 disposed within the channels 80 of the sea container and the second fluid contained within the navigable body of water. The heat exchanger 55 may for instance form a portion of the vessel in fluid communication with each of the navigable body of water and the fluid conduit 100. If the arrangement of FIG. 12 is used, the water forming the navigable body of water may act as the fluid source 224. The vessel used to transport the sea container may include a water transport system (not shown) configured to transport the water from an exterior of the vessel and to the fluid conduit 100 of each of the sea containers. Such an arrangement may be used when the water of the navigable body of water does not pose a threat of damaging any components of the temperature controlled structure assembly 10 forming the sea container. As should be understood, the water from the navigable body of water may act to heat or cool the sea container depending on a temperature of the sea container relative to a temperature of the water.

Figure 19:
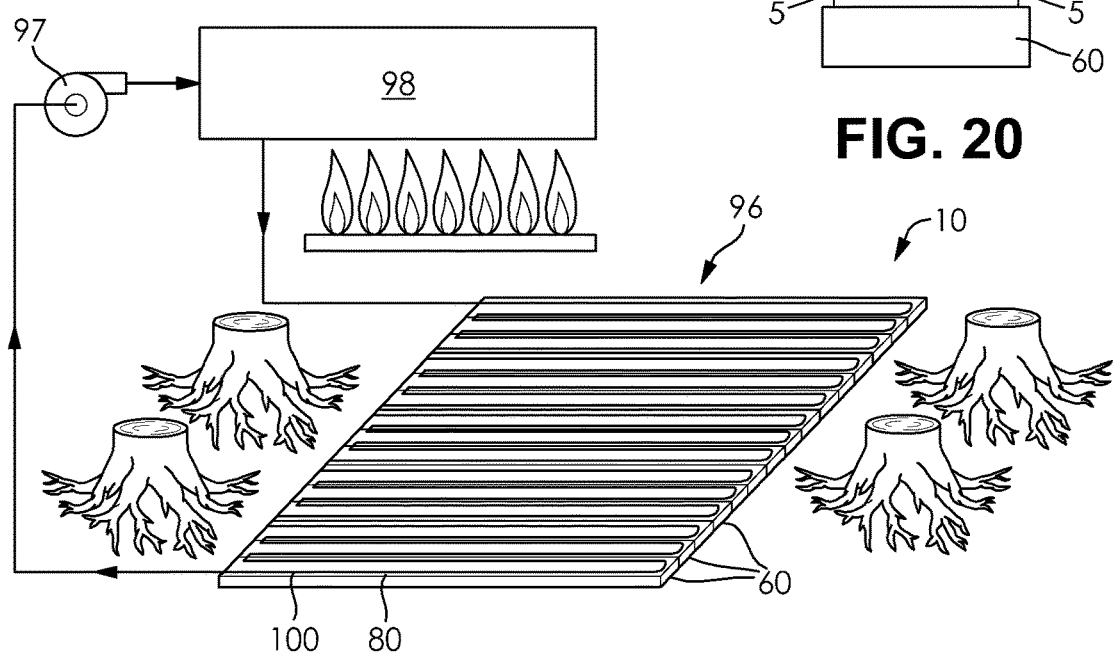
FIG. 19 is a schematic flow diagram of the temperature controlled structure assembly in heat exchange relationship with a grove of frost sensitive plants.

FIG. 19 illustrates the temperature controlled structure assembly 10 as forming a pathway 96 through a grove or field containing a plurality of plants disposed to either side of the pathway 96. The plants disposed adjacent the pathway 96 may be trees, shrubs, bushes, grape-bearing vines, or flowers, as non-limiting examples. The plants may be arranged into rows and columns or the plants may be arranged in other geometric shapes, as desired. One representative application of the pathway 96 may be to dispose the pathway 96 through a citrus grove comprised of temperature sensitive plants, wherein a temperature sensitive plant is a plant that may be damaged or otherwise has a function thereof interrupted by exposure to extreme temperatures, either hot or cold, or by the introduction of frost on a surface of the temperature sensitive plant. Another representative application for the pathway 96 may be to dispose the pathway 96 in a vineyard comprised of grape-bearing vines. Traditionally, such vineyards or other plant arrangements may plow accumulated snow present adjacent the vineyard to surround each of the plants to shield and insulate each of the plants from extremely low ambient temperatures. Such a method is problematic for at least three reasons. First, such a snow accumulation may not be present when extreme temperatures are encountered. Second, such plowing may be labor intensive and expensive. Third, the act of plowing immediately adjacent the plants may be damaging to the plants. Accordingly, the temperature controlled structure assembly 10 formed into the pathway 96 may be utilized in such circumstances to protect such plants from the environment during especially harsh ambient conditions.

The pathway 96 is formed from a planar array of the structural panels 60 extending between adjacent plants or adjacent groupings of the plants. Although not pictured, it should be understood that the array of the structural panels 60 may be subsequently covered with at least one of the functional panels 20 to cover the channels 80 formed in the structural panels 60 after at least one of the fluid conduit 100 or the electrical element 300 is disposed within each of the channels 80.

The pathway 96 may receive the fluid conduit 100, the electrical element 300, or a combination thereof in the channels 80 formed in the structural panels 60 to allow the pathway 96 to perform a heating function, a cooling function, or a combination thereof. The pathway 96 is shown in FIG. 19 as having the fluid conduit 100 disposed in the channels 80 thereof, thereby allowing for the pathway 96 to be heated or cooled by the first fluid passing through the fluid conduit 100. The first fluid contained within the fluid conduit 100 may for example be pumped through the pathway 96 by means of a pump 97 and the first fluid may also be heated by passing through a boiler 98, as a non-limiting example. However, any form of heat exchanging device may be used in place of the boiler 98 without departing from the scope of the present invention.

In use, the pump 97 causes the first fluid to flow through the boiler 98 or other heat exchanging device where the first fluid is heated before reaching the pathway 96. When in the pathway 96, the first fluid then exchanges heat energy with the structural panels 60 and the functional panels 20 (not illustrated in FIG. 19) to heat the pathway 96. Accordingly, the pathway 96 may be arranged between adjacent rows or groupings of the plants forming the field or grove to most efficiently distribute the heat energy supplied by the first fluid to the pathway 96.

Figure 20:
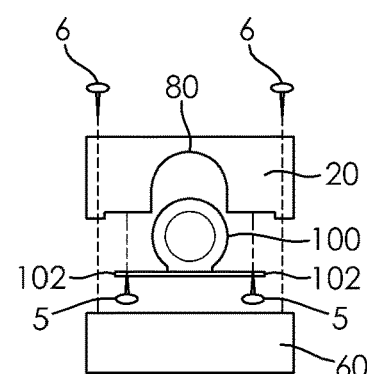
FIG. 20 is an exploded front elevational view of an alternative arrangement of a structural panel and a functional panel according to another embodiment of the invention.

Although the structural panels 60 have been described as having the channels 80 formed therein for routing at least one of the fluid conduit 100 or the electrical component 300 therethrough, it should be understood that an opposite arrangement in which each of the channels 80 is instead formed in a surface of each of the functional panels 20 may be used without departing from the scope of the present invention. For example, with reference to FIG. 20, the functional panel 20 is shown as having one of the channels 80 formed therein for receiving at least one of the fluid conduit 100 or the electrical element 300 therein. FIG. 20 shows the fluid conduit 100 as being disposed in the channel 80 and coupled to the functional panel 20 be means of the first fastening devices 5 extending through the tabs 102 of the fluid conduit 100. The functional panel 20 is then coupled to the structural panel 60 by means of the second fastening devices 6. Accordingly, each portion of the temperature controlled structure assembly 10 shown and described with reference to FIGS. 1-19 as corresponding to the structural panels 60 may be formed in an opposite arrangement wherein the outermost functional panels 20 are used to form the continuous channel 81 by means of the alignment of corresponding connection points 70. Additionally, the functional panels 20 may be configured for use with one or more of the plug seal 40, the plug seal 140, or the foam wrap 110, as desired.

When such an opposite arrangement is used, the temperature controlled structure assembly 10 may be assembled by first assembling the array of the structural panels 60. In some embodiments, the structural panels 60 may be coupled to a structural frame 12. The structural frame 12 may for example be formed from a plurality of the cross-members 14. Once the array of the structural panels 60 is assembled one of the heating or cooling elements in the form of at least one of the fluid conduit 100 and the electrical element 300 is coupled to the array of the functional panels 20 after the heating or cooling element has been routed through each of the channels 80 formed in the array of the functional panels 20. At least one portion of the heating or cooling element may extend across at least one of the connection points 70 formed between adjacent ones of the functional panels 20 to form the continuous channel 81. Once the array of the functional panels 20 has received the heating or cooling element in the continuous channel 81 thereof the array of the functional panels 20 may be placed over the array of the structural panels 60 and coupled thereto to complete the temperature controlled structure assembly 10. The temperature controlled structure assembly 10 having the opposite arrangement may be formed into any of the structures shown and described herein including those arrangements shown in FIGS. 11, 12, and 16-19, for example.

The temperature controlled structure assembly 10 provides for a variety of advantageous features. First, the installation of the heat exchanging elements within the continuous channel 81 formed amongst a plurality of the structural panels 60 allows for the exposed functional panels 20 to be removed, replaced, repaired, or refinished without disturbing the remainder of the temperature controlled structure assembly 10. For example, the functional panels 20 may be in the form of wood that is uncoupled from the underlying structural panels 60 as a complete batch that is then stained at a remote location before being replaced as a complete batch. The ability to have the functional panels 20 refinished at a remote location may be particularly helpful in the case of elderly or disabled persons that may have difficulty in performing a similar function on their own. Alternatively, rather than merely altering the appearance of the functional panels 20, an entirely new set of the functional panels 20 having completely different characteristics may be installed in place of the removed functional panels 20.

Second, the temperature controlled structure assembly 10 may be adapted for installation within a preexisting structure. Such a preexisting structure may form at least a portion of the structural frame 12 to which the temperature controlled structure assembly 10 may be coupled. Examples of preexisting structures suitable for installation of the temperature controlled structure assembly 10 may include patio structures, deck structures, staircase structures, walkway structures, bench or other seating structures, storage structures, and shipping structures, as non-limiting example. Accordingly, the temperature controlled structure assembly 10 allows a user to advantageously heat or cool a variety of preexisting structures that may present concerns relating to an excessively hot surface, an excessively cold surface, a slippery surface, or a surface subject to freezing, for example.

Third, the use of a continuous channel 81 that is formed by the cooperation of a plurality of channels 80 formed within a plurality of structural panels 60 allows for each of the heating and cooling elements to be routed within the continuous channel 81 as a single, continuous unit. For example, the fluid conduit 100 is described as having no fluid connections formed between the inlet 35 into the array of the structural panels 60 and the outlet 36 thereof. The use of a continuous fluid conduit 100 without intermediate fluid connections aids in preventing the incidence of leaks or broken connections between the inlet 35 and the outlet 36. Additionally, the use of the continuous fluid conduit 100 allows for any length of the fluid conduit 100 to be routed through any configuration of the fluid channels 80 in a single installation process, whereas the use of a non-continuous fluid conduit requires each subsequent section of the fluid conduit to be coupled and sealed relative to the preceding section during the installation process, greatly increasing the time required to properly install such a system.

Fourth, the use of flexible heat exchanging elements allows for the temperature controlled structure assembly 10 to be adapted for use with any configuration of the structural panels 60 and the channels 80 formed therein, including three-dimensional structures in need of both horizontally and vertically extending connections. Accordingly, the continuously formed and flexible heat exchanging elements allow the user to create nearly any form of structure using the structural panels 60, including walkways, benches, stairs, or ramps, as non-limiting examples, without being constrained to using segmented heat exchanging elements that may not be suitable for use in the proposed structure. In other words, the user is not required to use heat exchanging elements having a particular size and shape suitable for each different type of structural panel 60 having a particular size and shape. Accordingly, the user needs only select the proper structural panels 60 for forming a desired structure without needing to utilize corresponding heat exchanging element segments that are specifically adapted for use therewith.

Furthermore, it should be understood that each of the features described herein with reference to one specific arrangement of the temperature controlled structure assembly 10 may be adapted for use with any other arrangement without departing from the scope of the present invention. For example, each of the structural panels 60 may be adapted for use with either of the fluid conduit 100 or the electrical element 300, or combinations thereof, as desired. Similarly, each of the structural panels 60 may be adapted for use with one or more of the plug seal 40, the plug seal 140, or the foam wrap 110, as desired. Any structural utilizing the temperature controlled structure assembly 10 may further be adapted for use with any type of drainage system including any form of the drip pan 54, as desired. Other potential combinations of the features and structures described hereinabove may also be readily apparent to one skilled in the art without departing from the scope of the present invention, as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A temperature controlled structure assembly comprising:
   an array of structural panels, each of the structural panels including a channel formed therein, the channel intersecting a peripheral edge of a corresponding one of the structural panels to form a connection point thereof;
   an array of functional panels with each of the functional panels having an exposed portion for contact with a user, each of the functional panels contacting at least one of the structural panels;
   a conduit disposed in each of the channels of the array of structural panels and configured to convey a first fluid therethrough, the first fluid configured to exchange heat with at least one of the functional panels, wherein the conduit extends from an inlet of the array of structural panels to an outlet of the array of structural panels;
   a first fluid line in fluid communication with the conduit, the first fluid line extending outside of the array of the structural panels from the outlet thereof to the inlet thereof, wherein the first fluid line is in fluid communication with at least one of a heat exchanging device or a fluid source configured to store at least a portion of the first fluid;
   a first pump in fluid communication with the first fluid line and configured to cause the first fluid to flow through the conduit;
   a sensor configured to monitor a temperature of a surface of at least one of the functional panels of the array of functional panels; and
   a controller in signal communication with the first pump and the sensor, the controller configured to activate the pump when the sensor determines that the temperature of the surface of the at least one of the functional panels of the array of functional panels is above or below a predetermined temperature value.

2. The assembly according to claim 1, wherein each of the connection points is aligned with an adjacent one of the connection points to form a continuous channel extending through at least two of the structural panels, wherein the conduit is continuous and contains no fluid connections therealong within any of the channels or at any of the connection points.

3. The assembly according to claim 1, wherein a drip pan is disposed beneath the structural panels for collecting fluid disposed on an exposed surface of the functional panels, wherein the controller is in signal communication with a sensor associated with the drip pan, wherein the sensor associated with the drip pan is configured to determine a condition of the drip pan.

4. The assembly according to claim 1, wherein at least one of the channels also includes an electrical element disposed therein, wherein the electrical element is in electrical communication with a power source, and wherein the electrical element includes at least one of a heating mode or a cooling mode.

5. The assembly according to claim 4, wherein the electrical element is one of a solid state electrical resistance heater, a Peltier effect refrigeration element, or a combined solid state electrical resistance heater and Peltier effect refrigeration element.

6. The assembly according to claim 5, wherein the power source is in electrical communication with the controller, and wherein the controller is configured to apply an electrical current to the electrical element when the sensor determines that the temperature of the surface of the at least one of the array of functional panels is one of above or below the predetermined temperature value.

7. The assembly according to claim 4, wherein the power source is in electrical communication with the controller, and wherein the controller is in signal communication with a remotely controlled device.

8. The assembly according to claim 7, wherein the remotely controlled device communicates with the controller using wireless communication.

9. The assembly according to claim 1, wherein the controller is in signal communication with a remotely controlled device.

10. The assembly according to claim 9, wherein the remotely controlled device communicates with the controller using wireless communication.

11. The assembly according to claim 9, wherein the controller is in signal communication with the heat exchanging device, wherein the remotely controlled device is configured to control each of the pump and the heat exchanging device via the controller.

12. The assembly according to claim 9, wherein the remotely controlled device is a mobile device.

13. The assembly according to claim 1, wherein the first fluid line is in fluid communication with the heat exchanging device, and wherein the assembly further comprises a second fluid line conveying a second fluid isolated from the first fluid, wherein the second fluid line is in fluid communication with each of a second pump, a heating or cooling source for heating or cooling the second fluid, and the heat exchanging device of the first fluid line for exchanging heat energy between the first fluid and the second fluid, wherein the second pump is in signal communication with the controller, and wherein the controller is configured to activate the second pump in unison with the first pump when the sensor determines that the temperature of the surface of the at least one panel of the functional panels is above or below the predetermined temperature value, the second pump causing the second fluid to circulate through the heating or cooling source and the heat exchanging device.

14. The assembly according to claim 13, wherein a temperature of the first fluid is higher than a temperature of the second fluid in the heating and cooling source when the sensor determines that the temperature of the surface of the at least one of the functional panels is above the predetermined temperature value.

15. The assembly according to claim 13, wherein a temperature of the first fluid is lower than a temperature of the second fluid in the heating and cooling source when the sensor determines that the temperature of the surface of the at least one of the functional panels is below the predetermined temperature value.

16. The assembly according to claim 1, wherein the first fluid line is in fluid communication with the fluid source and the array of functional panels is exposed to sunlight.

17. The assembly according to claim 16, wherein the fluid source is a swimming pool and the array of functional panels forms a surface adjacent the swimming pool.

18. The assembly according to claim 16, wherein the first fluid receives heat energy from at least one of the functional panels exposed to the sunlight to reduce a temperature of the at least one of the functional panels and to increase a temperature of the first fluid.

19. The assembly according to claim 18, wherein the fluid source is a swimming pool and the at least one of the functional panels forms a surface adjacent the swimming pool.

20. The assembly according to claim 1, wherein the first fluid line is in fluid communication with the fluid source, wherein at least one of the functional panels has a lower surface temperature than the first fluid source, and wherein the at least one of the functional panels receives heat energy from the first fluid to increase a surface temperature of the at least one of the functional panels.

21. The assembly according to claim 20, wherein the fluid source is a swimming pool and the at least one of the functional panels forms a surface adjacent the swimming pool.

22. The assembly according to claim 1, wherein the first fluid line is in fluid communication with the heat exchanging device, wherein the heat exchanging device is in fluid communication with a second fluid isolated from the first fluid.

23. The assembly according to claim 22, wherein the second fluid is water originating from a body of water and the array of functional panels forms a portion of a boardwalk structure adjacent the body of water.

24. The assembly according to claim 22, wherein the second fluid flows through a second fluid line separate from the first fluid line, wherein heat energy is exchanged between the first fluid and the second fluid at the heat exchanging device.

25. The assembly according to claim 24, wherein the second fluid is water originating from a body of water and circulating through the second fluid line.

26. The assembly according to claim 25, wherein at least one of the functional panels forms a portion of a boardwalk structure adjacent the body of water.

27. The assembly according to claim 24, wherein the second fluid is at least one of water, brine, a water and glycol solution, and oil.

28. The assembly according to claim 1, wherein the first fluid line is in fluid communication with the heat exchanging device, wherein the heat exchanging device is one of a boiler, a heat pump, an electrical heater, or a device configured to utilize solar energy to produce heat.

29. The assembly according to claim 1, wherein the first fluid line is in fluid communication with the heat exchanging device, wherein the heat exchanging device is a hot water heater and the first fluid is water heated by the hot water heater.

30. The assembly according to claim 1, wherein the first fluid line is in fluid communication with the heat exchanging device, wherein the heat exchanging device is one of a chiller or an air conditioning unit.

31. The assembly according to claim 1, wherein a conically shaped plug seal is received in a recess formed in each of the structural panels, the plug seal including an opening formed therethrough extending from a first end to a second end of the plug seal and receiving the conduit therein, the plug seal including a flanged portion at the first end thereof and a tapered portion tapering inwardly as the tapered portion extends from the flanged portion towards the second end of the plug seal.

32. The assembly according to claim 31, wherein an inner surface of the plug seal defining the opening includes radially inwardly extending teeth configured to engage and penetrate an outer surface of the conduit to secure a position of the plug seal relative to the outer surface of the conduit.

33. The assembly according to claim 1, wherein at least one of the functional panels is removably coupled to at least one of the structural panels to allow the at least one of the functional panels to be manipulated independently of the at least one of the structural panels.

34. The assembly according to claim 1, wherein each panel of the array of structural panels includes at least one waste material.

35. The assembly according to claim 34, wherein each panel of the array of structural panels includes at least one of shredded tires, particle board, shredded bamboo, palm fronds, knot-containing wood, and chimney fly ash.

36. A temperature controlled structure assembly comprising:
a plurality of structural panels, each of the structural panels including a channel formed therein, the channel intersecting a peripheral edge of a corresponding one of the structural panels to form a connection point thereof;
a plurality of functional panels with each of the functional panels having an exposed portion for contact with a user, each of the functional panels contacting at least one of the structural panels;
an electrical element disposed in each of the channels and configured to exchange heat with at least one of the functional panels, the electrical element in electrical communication with a power source;
a controller in signal communication with the power source; and
a sensor in signal communication with the power source, wherein the sensor is configured to determine a condition of a surface of at least one of the functional panels, and wherein the controller is configured to cause an electrical current originating from the power source to be applied to the electrical element when the sensor determines that a preselected condition of the surface of the at least one of the functional panels is met.

37. The assembly according to claim 36, wherein the electrical element includes at least one of a solid state electrical resistance heater, a Peltier effect refrigeration element, and a combined solid state electrical resistance heater and Peltier effect refrigeration element.

38. The assembly according to claim 36, wherein the electrical element has both a heating mode and a cooling mode, the electrical element switchable between the heating mode and the cooling mode.

39. The assembly according to claim 36, wherein the electrical element is formed from a plurality of coupled segments, and wherein the segments are coupled to each other by corresponding mating features.

40. The assembly according to claim 36, wherein the electrical element includes two leads extending therethrough, and wherein an end-turnaround segment is coupled to an end of the electrical element to electrically connect the two leads of the electrical element.

41. The assembly according to claim 36, wherein the preselected condition of the surface of the at least one of the functional panels is a temperature thereof.

42. The assembly according to claim 36, wherein the power source is in signal communication with a controller, wherein the controller is in wireless signal communication with a remotely controlled device, and wherein the controller is configured to cause the power source to apply an electrical current to the electrical element in response to a signal communicated from the remotely controlled device to the controller.

43. A method of forming a temperature controlled structure, the method comprising the steps of:
    assembling an array of structural panels, a channel formed in each structural panel of the array of structural panels, the channel intersecting a peripheral edge of each structural panel of the array of structural panels to form a connection point of the channel;
    providing an array of functional panels;
    routing a heat exchanging element through the channel of each structural panel of the array of structural panels, wherein the heat exchanging element extends across at least one of the connection points, wherein the heat exchanging element is continuous and contains no fluid connections therealong within any of the channels or at any of the connection points;
    coupling the heat exchanging element to the array of structural panels;
    providing a sensor configured to monitor a temperature of a surface of at least one functional panel of the array of functional panels, a pump for causing a fluid to flow through the heat exchanging element, and a controller in signal communication with the sensor and the pump, the controller configured to activate the pump when the sensor determines that the temperature of the surface of the at least one functional panel of the array of functional panels is one of above or below a predetermined temperature value; and
    coupling the array of functional panels to the array of structural panels having the heat exchanging element coupled thereto.

44. The method according to claim 43, further comprising a step of coupling the array of the structural panels to a structural frame.

45. The method according to claim 44, wherein the structural panels are coupled to the structural frame using a first fastening device.

46. The method according to claim 45, wherein each of the structural panels is coupled to one of the functional panels using a second fastening device.

* * * * *